US008298106B2

(12) United States Patent
Larkin

(10) Patent No.: US 8,298,106 B2
(45) Date of Patent: Oct. 30, 2012

(54) STEERING TRANSMISSION FOR TRACKED VEHICLES

(75) Inventor: Robert Francis Larkin, Pittsfield, MA (US)

(73) Assignee: Berkshire Powertech, Inc., Lee, MA (US)

( * ) Notice: Subject to any disclaimer, the term of this patent is extended or adjusted under 35 U.S.C. 154(b) by 470 days.

(21) Appl. No.: 12/581,653

(22) Filed: Oct. 19, 2009

(65) Prior Publication Data

US 2010/0113203 A1 May 6, 2010

Related U.S. Application Data

(60) Provisional application No. 61/196,370, filed on Oct. 17, 2008.

(51) Int. Cl.
*F16H 47/04* (2006.01)
*B62D 11/06* (2006.01)

(52) U.S. Cl. ............... 475/74; 475/24; 475/83

(58) Field of Classification Search ............ 475/22, 475/23, 24, 72, 73, 74, 80, 83
See application file for complete search history.

(56) References Cited

U.S. PATENT DOCUMENTS

| 3,503,278 A * | 3/1970 | Livezey ............ 74/661 |
| 3,583,256 A * | 6/1971 | Livezey ............ 475/24 |
| 3,815,698 A | 6/1974 | Reed |
| 4,345,488 A * | 8/1982 | Reed ............... 475/24 |
| 5,730,678 A | 3/1998 | Larkin |

* cited by examiner

*Primary Examiner* — Roger Pang
(74) *Attorney, Agent, or Firm* — Buchanan Ingersoll & Rooney PC

(57) ABSTRACT

An infinitely variable hydromechanical crossdrive steering transmission having a multiple of forward and reverse ratio ranges and a separately selectable low ratio range in both forward and reverse. The forward and reverse ratio ranges are enabled to shift between ratio ranges in a synchronous manner in both speed and torque, thus smoothly propelling the vehicle from rest through the multiple transmission ranges to maximum speed in a stepless manner.

35 Claims, 24 Drawing Sheets

STEERING TRANSMISSION FOR TRACKED VEHICLES

RELATED APPLICATION

This application claims the benefit of the filing date of Provisional Application Ser. No. 61/196,370, filed Oct. 17, 2008.

FIELD OF INVENTION

The present invention relates to the field of steering transmissions for tracked vehicles, especially infinitely variable, multi-range, hydromechanical crossdrive steering transmissions.

BACKGROUND

A transmission described in Reed U.S. Pat. No. 3,815,698 and subsequent disclosures is commercially recognized as the HMPT500 hydromechanical crossdrive steering transmission, and is utilized on several military tracked vehicles such as the US Army Bradley Fighting Vehicle. The disclosure of the Reed patent is incorporated herein by reference. This highly successful transmission has been in continuous production since 1972. Some of the unique attributes of this transmission are its infinite ratio, stepless shift capability over three ratio ranges; as well as the utilization of two large capacity, bi-directional, ball-piston hydrostatic units. These units also provide a fully integrated steer capability under all operating conditions. A single reverse ratio range is also provided. Later improvements to this transmission include an extended ratio third range feature, and an electronic control system. However, increased vehicle performance requirements have shown that additional improvements to this transmission are necessary.

Increased vehicle armor has nearly doubled the original weight of many military tracked vehicles, and has become a factor in new vehicle design. With this higher weight has come the need for greater transmission output torque and increased engine horsepower to maintain adequate vehicle performance. These two requirements have severely challenged the capacity of the HMPT500 transmission, and have necessitated the improvements disclosed by this invention.

It would be desirable to restore the performance of the transmission by generating higher output torque by adopting a unique gearing architecture, while reducing the load levels of existing components in order to accommodate higher power levels.

It would also be desirable to improve overall transmission efficiency by reducing the magnitude of regenerative power losses in the higher ratio ranges; as well as improve shift performance to achieve a better "power match" at the shift points. This "power match" feature is described in the present inventor's U.S. Pat. No. 5,730,678, the disclosure of which is incorporated herein by reference.

SUMMARY

A hydromechanical drive and steering mechanism for a tracked vehicle comprises:
first and second driving outputs;
first and second power inputs arranged for driving connection to a prime mover;
a hydraulic drive mechanism comprising first and second bidirectional hydrostatic power units connected to be driven by the first power input and arranged to provide an infinitely variable transmission output speed ratio between the first power input and the first and second driving outputs;
the first driving output coupled to the first hydrostatic power unit output of the first hydrostatic power unit;
the second driving output connected to the hydrostatic power unit output of the second hydrostatic power unit;
a steering differential including:
 a first steering differential input coupled to the first hydrostatic power unit output,
 a second steering differential input coupled to the second hydrostatic power unit output, and
 a steering differential output providing an average output rotation of the first and second steering differential inputs;
a first selective coupling mechanism for selectively coupling the second power input to the first and second driving outputs; and
a second selective coupling mechanism for selectively coupling the steering differential output to the second power input;
wherein selective actuation of the first and second selective coupling mechanisms causes the transmission to drive in distinct ratio ranges.

BRIEF DESCRIPTION OF THE DRAWINGS

The accompanying drawings, which are incorporated in and constitute a part of this specification, illustrate several embodiments of the invention and together with the description, serve to explain principles of the invention. Like reference numerals refer to like parts throughout the figures.

FIG. 2 depicts the engagement of the engine through the actuation of the disconnect clutch as shown in FIG. 1a.

FIG. 3 shows transmission operation in 1st range at the 1st to 2nd FWD shift point.

FIG. 4 depicts transmission operation in 2nd FWD range at the 1st to 2nd FWD shift point.

FIG. 5 illustrates the condition where the "B" section of the hydrostatic assembly has decreased its speed from a negative direction to a zero speed condition.

FIG. 6 depicts transmission operation in 2nd FWD range at the 2nd FWD to 3rd range shift point.

FIG. 7 illustrates the 3rd range operating condition at the shift point.

FIG. 8 shows the condition where, after shifting into 3rd range, the action of the hydrostatic assembly causes the speed of the "B" section to reverse direction and decrease its speed until it achieves a zero output speed at sun gear S1.

FIG. 9 depicts transmission operation in 3rd range at the 3rd to 4th shift point.

FIG. 10 illustrates the 4th range operating conditions at the shift point.

FIG. 11 graphically illustrates that the torque to be accommodated by the 4th range clutch is 1.815 T, which is more than twice the output torque of the planetary gearsets in group 9 when taken as a whole.

FIG. 12 illustrates the 4th range operating condition where the "B" section of the hydrostatic assembly has decreased its speed from a negative direction to a zero speed condition.

FIG. 13 depicts the state of the transmission when a maximum output speed is attained.

FIG. 14 illustrates the transmission operating condition in 1st range reverse at the 1st reverse to 2nd REV shift point.

FIG. 15 illustrates the condition of FIG. 14 in 2nd range reverse.

FIG. 16 illustrates the two planetary gearsets of group 9 divided into their two separate levers.

FIG. 17 shows how, after the shift into 2nd REV range, the "B" section of the hydrostatic assembly reverses direction and decreases its speed until achieving a zero output speed on sun gear S1.

FIG. 18 shows the state of the transmission wherein maximum reverse output speed is attained.

FIG. 19 illustrates the torque loading on the internal transmission components in a stall, or zero output speed condition, in 1st range.

FIG. 20 illustrates the torque loading on internal transmission components in a stall, or zero output speed condition, in LOW range.

FIG. 21 depicts LOW range performance at its maximum forward output speed.

DETAILED DESCRIPTION OF PREFERRED EMBODIMENTS

Disclosed herein is an infinitely variable, multi-range, synchronous shift, hydromechanical crossdrive steering transmission comprised of four ratio ranges for forward operation and two ratio ranges for reverse operation. In addition, a separately selectable lower ratio range is provided for both forward and reverse operation, giving a total of five forward and three reverse ratio ranges. These features provide for a greatly increased output torque capability—nearly double that of the original HMPT500 transmission—as well as higher maximum output speed. The gearing architecture selected and attendant consideration of regenerative power flows also improves shift performance and transmission efficiency. As a result of this invention, the original design of the HMPT500 transmission is greatly improved to accommodate the expanded operational requirements of military tracked There is disclosed a unique gearing architecture with four planetary gearsets, two hydraulically energized clutches, and four hydraulically energized brakes which, when incorporated with certain components of a hydromechanical steering transmission as disclosed in U.S. Pat. No. 3,815,698, will result in a greatly improved tracked vehicle transmission for military applications. There results higher torque potential for greater tractive effort, higher speed, smoother shift performance, and improved efficiency by reduction in regenerative power levels.

Through the detailed description that follows, lever analogy analysis techniques will be utilized to graphically display the relative speeds of the various components as well as their direction by the use of vectors. As a further adaptation of this method, torque values are also calculated and displayed as a vector. The convention is that input speed and torque always have a value of unity, and that power is the product of speed× torque. That is (1.00N) (1.00 T)=1.00 P. Calculations are based upon equilibrium, i.e. action/reaction, at all levels; either the transmission as a whole, individual planetary gearsets, and at the hydrostatics. All losses are neglected such that the calculations are simplified to power in is equal to power out. Speeds are calculated by similar triangles or line slope, while torques are calculated by moment summation to zero about a point. Any operational point can be calculated and all values are determinable. All transmission torque and speed values are in terms of input speed and torque.

Figure 1A:
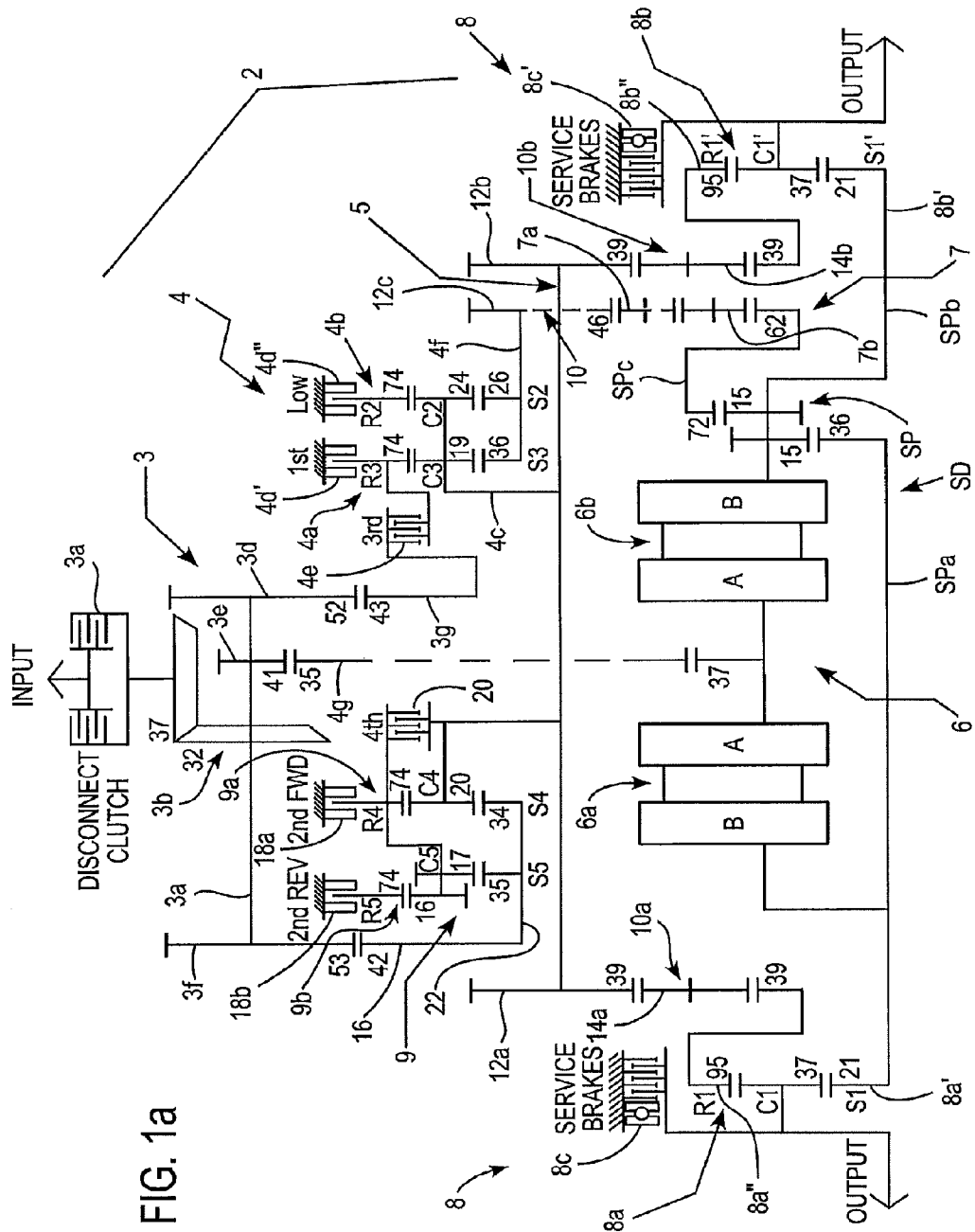
FIG. 1a is a schematic diagram of a hydromechanical crossdrive steering transmission, with an in-line engine/transmission arrangement, wherein the output axis corresponds in both arrangement and function to a similar output axis of aforementioned U.S. Pat. No. 3,815,698. The numbers shown adjacent to each gear in the figure identify the number of gear teeth on that gear.

Turning to the schematic diagram of FIG. 1a illustrating a preferred embodiment of the present invention, a multi-range hydromechanical crossdrive steering transmission, generally indicated at 2 includes an input section or group, generally indicated at 3, comprised of a disconnect clutch 3a for releasing and engaging the engine; a bevel gear arrangement 3b for translating the direction of the engine input, and a shaft 3c which rigidly affixes one of the bevel gears and three spur gears 3d, 3e and 3f so that all four gears rotate at the same speed. The gear 3e constitutes a first power input, and the gears 3d and 3f constitute respective parts of a second power input. The rightmost spur gear 3d of input section 3 is connected through a spur gear 3g to the 3rd/1st/LOW range section or group, generally indicated at 4, comprised of two separate input planetary gearsets 4a and 4b (suffixed by numerals 2 and 3) which share a common planet gear carrier 4c annotated as C2, C3. The carrier 4c is rigidly affixed to a crossshaft 5. The ring gears R2 and R3 of the planetary gearsets 4a, 4b each contain a hydraulically energized disc brake 4d', 4d" which, when activated, will cease the rotation of the ring gears by grounding them to the transmission housing. In addition, ring gear R3 is connected through the 3rd range clutch 4e to the spur gear 3d from input section 3 which, when hydraulically energized, will rigidly connect ring gear R3 to the input section 3. Furthermore, each planetary gearset 4a, 4b includes a separate sun gear indicated as S2 and S3, each rigidly affixed to a common shaft 4f.

Still referring to FIG. 1a, the middle spur gear 3e of input section 3 is connected through a spur gear train 4g to the hydrostatic section or group, generally indicated at 6, which is comprised of two separate and identical bi-rotational ball-piston hydrostatic assemblies 6a, 6b, each of which is composed of a variable displacement section A and a fixed displacement B. These hydrostatic assemblies, together with a steer planetary SP, forming a steering differential SD located to the right of the rightmost hydrostatic assembly 6b, are described in detail in the aforementioned Reed U.S. Pat. No. 3,815,698.

Referring to hydrostatic section 6, the ring gear SPc of the steer planetary SP is connected through a spur gear train, generally indicated at 7, to the common sun gear shaft of section 4. A notable feature of this gear train 7 is the use of two idler gears 7a, 7b between the steer planetary ring gear SP' and the sun gear shaft 4f. No gear tooth values are given for the two idlers as they are inconsequential. However, the utility of the two idler gears is their ability to reverse the direction of the sun gear shaft with respect to the rotation of the steer planetary ring gear R1'.

An additional feature of hydrostatic section 6 is that each hydrostatic unit separately connects to the sun gears S1, S1' of first and second driving outputs in the form of respective first and second output planetary gearsets 8a, 8b of an output planetary gearsets section or group 8. The planet gear carrier C1, C1' of each output planetary gearset 8a, 8b provides a separate output from the transmission, and will ultimately propel the vehicle through each of the two tracks. Service brakes 8c, 8c' for stopping the vehicle are also connected to respective ones of the output carriers C1'.

Still referring to the output planetary gearsets 8a, 8b, the respective output planetary ring gears R1 thereof are connected through a spur gear train 10a or 10b to separate spur gears 12a, 12b rigidly affixed to crossshaft 5; each gear train of which includes a single idler gear 14a, 14b. The utility of the single idler gears is their ability to maintain the same direction of rotation of crossshaft 5 as that of the ring gears R1, R1'.

Returning to input section 3, the leftmost spur gear 3f is connected through a spur gear 16 to the 2nd FWD/2ndREV/ 4th section or group, generally indicated at 9, comprised of two separate planetary gearsets 9a, 9b, suffixed as planetaries 4 and 5. It is noted that planetary gearset 9b is composed of meshed planet gear pairs, whereas planetary 9a is composed of single planet gears. Each planetary ring gear, R4 and R5 of the gearsets 9a, 9b is associated with a hydraulically energized disc brake 18a, 18b which, when activated, ceases the rotation of the respective ring gear by grounding it to the transmission housing. In addition, planet gear carrier C4 of the planetary gearset 9a is rigidly affixed to crossshaft 5 and is also connected to ring gear R4 through the 4th range clutch 20 which, when hydraulically energized, will rigidly connect carrier C4 with ring gear R4. Furthermore, ring gear R4 is rigidly connected to planet gear carrier C5; whilst the separate sun gears S4 and S5 are rigidly affixed to a common shaft 22 and connect through the spur gears 3d and 16 to input section 3.

As will be seen from the description to follow, engine power will flow through the input section 3 through the three spur gears 3d-3f, depending upon the mode of operation. In all forward and reverse ranges power is alternately flowing to, or being received from, the hydrostatic section 6 through the middle spur gear 3e. When power is being received from the hydrostatic section 6, it is regenerative power as developed elsewhere within the transmission and is added to the engine power at the input section 3. Thus, a greater magnitude of horsepower can be realized within the transmission than is actually supplied externally from the engine. The ability to control this regenerative power and subsequently utilize it for advantage is a significant aspect of this invention.

Since the hydrostatic units 6a, 6b in section 6 are bi-rotational, it is possible to utilize this feature to extend the ratio coverage provided by each individual ratio range. That is, a ratio range—except 1st and LOW—can cover the full aspect from maximum negative hydrostatic speed to maximum positive hydrostatic speed, and thus a fewer number of ranges are needed to cover the performance spectrum of the transmission. Since 1st and LOW must start from a neutral, no output, position, their ratio creation will be one-directional, either positive or negative.

To summarize the foregoing, it will be understood that the first 3e and second 3d, 3f power inputs are in driving connection to the prime mover 3a. A hydraulic drive mechanism comprised of the first and second bidirectional hydrostatic power units 6a and 6b are connected to be driven by the first power input 3e and are arranged to provide an infinitely variable transmission output speed ratio between the first power input 3e and the first and second driving outputs 8a, 8b, respectively. The first driving output 8a is coupled to the first hydrostatic power unit output of the first hydrostatic power unit 6a. The second driving output 8b is connected to the hydrostatic power unit output of the second hydrostatic power unit 6b. The first steering differential input SPa of the steering differential SD is coupled to the output of the first hydrostatic power unit 6a, and the second steering differential input SPb of the steering differential SD is coupled to the output of the second hydrostatic power unit 6b. An output SPc of the steering differential provides an average output rotation of the first and second steering differential inputs SPa, SPb. A first selective coupling mechanism comprised of the elements 4a, 4b, 9a, 9b, 4e, 20, 12a, 12b selectively couples the second power input 3d, 3f to the first and second driving outputs 8a, 8b. A second selective coupling mechanism comprised of elements 4a, 4b, 20, 7a, 7b, 4f selectively couples the steering differential output SPc to the second power input 3d, 3f. Selective actuation of the first and second selective coupling mechanisms causes the transmission to drive in distinct ratio ranges as will be explained hereafter.

The second power input includes the first and second mechanical inputs 3d, 3f. The first mechanical input comprises a first gear element 3d to which are connected first and second interconnected input planetary gearsets 4a, 4b. The first and second input planetary gearsets are connected to the output SPc of the steer differential SD by a first spur gear arrangement 10 for delivering power to, and receiving power from, the steer differential. The first and second input planetary gearsets are also connected by a second spur gear arrangement 10a to the first driving output 8a and connected by a third spur gear arrangement 10b to the second driving output 8b. The first and second input planetary gearsets are shiftable to produce low, first and third ratio ranges at each of the first and second driving outputs.

The second mechanical input 3f comprises a second gear element connected to interconnected third and fourth input planetary gearsets 9a, 9b. The third and fourth input planetary gearsets are connected to the first driving output by the second spur gear arrangement 10a and to the second driving output 8b by the third spur gear arrangement 10b. The third and fourth input planetary gearsets are shiftable to produce second-forward, second-reverse, and fourth ranges at each of the first and second driving outputs. The second and third spur gear arrangements 10a, 10b are interconnected through the crosshaft 5 such that all of the input planetaries 4a, 4b, 9a, 9b act on both of the driving outputs 8a, 8b in an identical manner during forward and rearward vehicle travel.

The first and second driving outputs 8a, 8b comprise first and second output planetary gearsets 8a, 8b, respectively, each having first and second inputs and an output. The first input 8a' of the first output planetary gearset includes a sun gear S1 coupled to the output of the first hydrostatic power unit 6a. The first input 8b' of the second output planetary gearset includes a sun gear S1' connected to the output of the second hydrostatic power unit 6b. The second input 8a'' of the first output planetary gearset includes a ring gear R1 connected to the first, second, third and fourth planetary gearsets by the second spur gear arrangement 10a. The second input 8b'' of the second output planetary gearset includes a ring gear R1' connected to the first, second, third and fourth input planetary gearsets by the third spur gear arrangement 10b. The number of gear tooth meshes of the first spur gear arrangement and of the third spur gear arrangement cannot both yield an integer when divided by 2.

Each of the first and second input planetary gearsets 4a, 4b is a simple planetary gearset comprising a sun gear and a ring gear interconnected by a single set of planet gears mounted on a planet carrier. The sun gears S3, S2 of the first and second input planetary gearsets, respectively, are coupled to the first spur gear arrangement 10. The planet carriers C2, C3 of the first and second input planetary gearsets, respectively, are coupled to the first and second driving outputs 8a, 8b. The element 4e of the first selective coupling mechanism is operable to selectively couple the first gear element 3d of the first mechanical input to the ring gear R3 of the second input planetary gearset 4b. A first selective grounding mechanism 4d', 4d'' can selectively ground the ring gears R2, R3 of the first and second input planetary gearsets.

The third input planetary gearset 9a is a simple planetary gear set comprising a sun gear S4 and a ring gear R4 interconnected by a single set of planet gears mounted on a planet carrier C4. The fourth input planetary gearset 9b is a compound gearset comprising two sets of planet gears carried by a planet gear carrier C5 which connects a sun gear S5 to a ring gear R5 of the compound planetary gearset. Both sun gears of the third and fourth input planetary gearsets S4, S5 are coupled to the gear element 13f of the second mechanical input. The ring gear R4 of the third input planetary gearset is connected to the planet gear carrier C5 of the fourth input planetary gearset. A selectively actuable coupler 20 can selectively couple together the ring gear R4 and the planetary gear carrier C4 of the third input planetary gearset. The planet gear carrier C4 of the third input planetary gearset is coupled to the first and second driving outputs 8a, 8b. A second selective grounding mechanism 18a, 18b is provided for selectively grounding the ring gears of the third and fourth input gearsets.

In operation, the transmission will begin from a neutral, no output ratio, condition at the hydrostatic units and increase speed ratio to its maximum 1st range value. At that point, the transmission will upshift into 2nd range and continue to increase transmission ratio as the hydrostatic units 6a, 6b decrease their speed ratio back through neutral and into the reverse direction until this maximum value is achieved. At that point the transmission will upshift into 3rd range while the hydrostatic units 6a, 6b again reverse direction, pass through neutral, and achieve their maximum speed in the other direction. An upshift to 4th range repeats the cycle once again, at which time the transmission has attained its maximum speed. During the period that the hydrostatic units 6a, 6b are continuously increasing and decreasing their speed, the transmission output speed has increased smoothly and in a step-less manner. The ability to achieve these features is the result of the gearing architecture and the synchronous actuation of the various brakes and clutches. It should be noted that the operation of the transmission of the aforementioned Reed patent began with the hydrostatic unit speed in a positive, or outputwise, direction whereas the presently disclosed transmission begins with hydrostatic speed in a negative, or anti-outputwise, direction. However, the top ratio range in both the Reed transmission and the presently disclosed transmission conclude with hydrostatic speed in a positive direction, i.e., 3rd range in the original and 4th range.

The bi-directional capability of the hydrostatic assemblies provide for forward and reverse operation to be achieved in both 1st and LOW ranges.

Figure 1B:
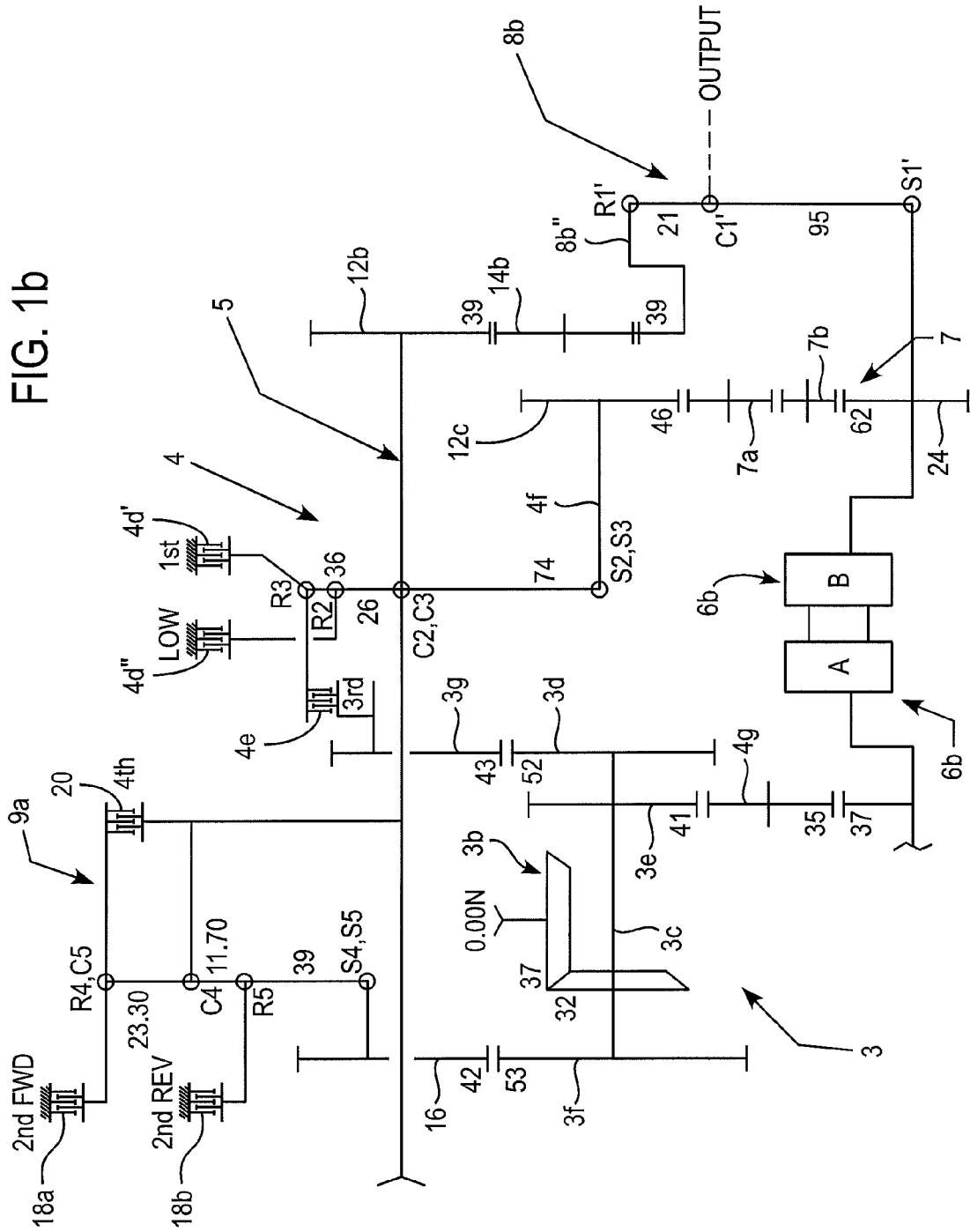
FIG. 1b is a lever analogy diagram of the hydromechanical crossdrive steering transmission as represented in FIG. 1a. The lever analogy technique is presented in the publication SAE910958 (1991) published by the Society of Automotive Engineers, Inc. Omitted from FIG. 1b are duplicate output features on the left side of FIG. 1a, as well as the steering planetary gearing arrangement shown in FIG. 4 of U.S. Pat. No. 3,815,698. Remaining components have been arranged in a simplified manner. The two planetary gearsets annotated as "1st" and "LOW" in FIG. 1a have been combined into a single lever in FIG. 1b. Similarly, the two planetary gearsets annotated as "2nd REV" and "2nd FWD" in FIG. 1b have been combined into a single lever. The various connections between components, as well as their respective number of gear teeth, are uniformly identified in both FIG. 1a and FIG. 1b.

FIG. 1b is a lever analogy diagram of the transmission 2 shown schematically in FIG. 1a. This diagram has been simplified by deleting the leftmost output planetary gearset 8a as well as the leftmost hydrostatic assembly and steer planetary 6a shown in FIG. 1a. For purpose of explanation of this invention, all hydrostatic power will be depicted as flowing through the remaining rightmost hydrostatic assembly 6b to the rightmost output planetary gearset 8b. In addition, the connection of the former steer planetary SP to gear train 7 is depicted as a spur gear 24. These simplifications can be rationalized by noting that the leftmost output planetary 8a of FIG. 1a is connected to the crossshaft 5 and the leftmost hydrostatic assembly in an identical manner as the rightmost hydrostatic assembly and may thus be considered redundant to the following analysis. The substitution of the spur gear 24 for the steer planetary SP will allow direct power transfer to gear train 7 without the need to combine the power flows from both hydrostatic assemblies as provided by the steer planetary SP.

Still referring to FIG. 1b, all of the planetary gearsets identified in sections 4, 8, and 9 of FIG. 1a have been depicted as levers in accordance with the principles presented in the publication SAE910958 (1991). In addition, the various interconnections of the gearsets to their respective clutches and brakes, and their positioning and connections within the transmission as a whole are fully depicted. That gearing architecture will achieve the performance objectives previously described in the background section. The diagram shown in FIG. 1b will be utilized throughout the remainder of this disclosure as the means of displaying power flows within the transmission and to quantify transmission performance.

FIG. 1b is also representative of a "neutral" transmission condition wherein the engine is disengaged from the transmission.

Figure 2:
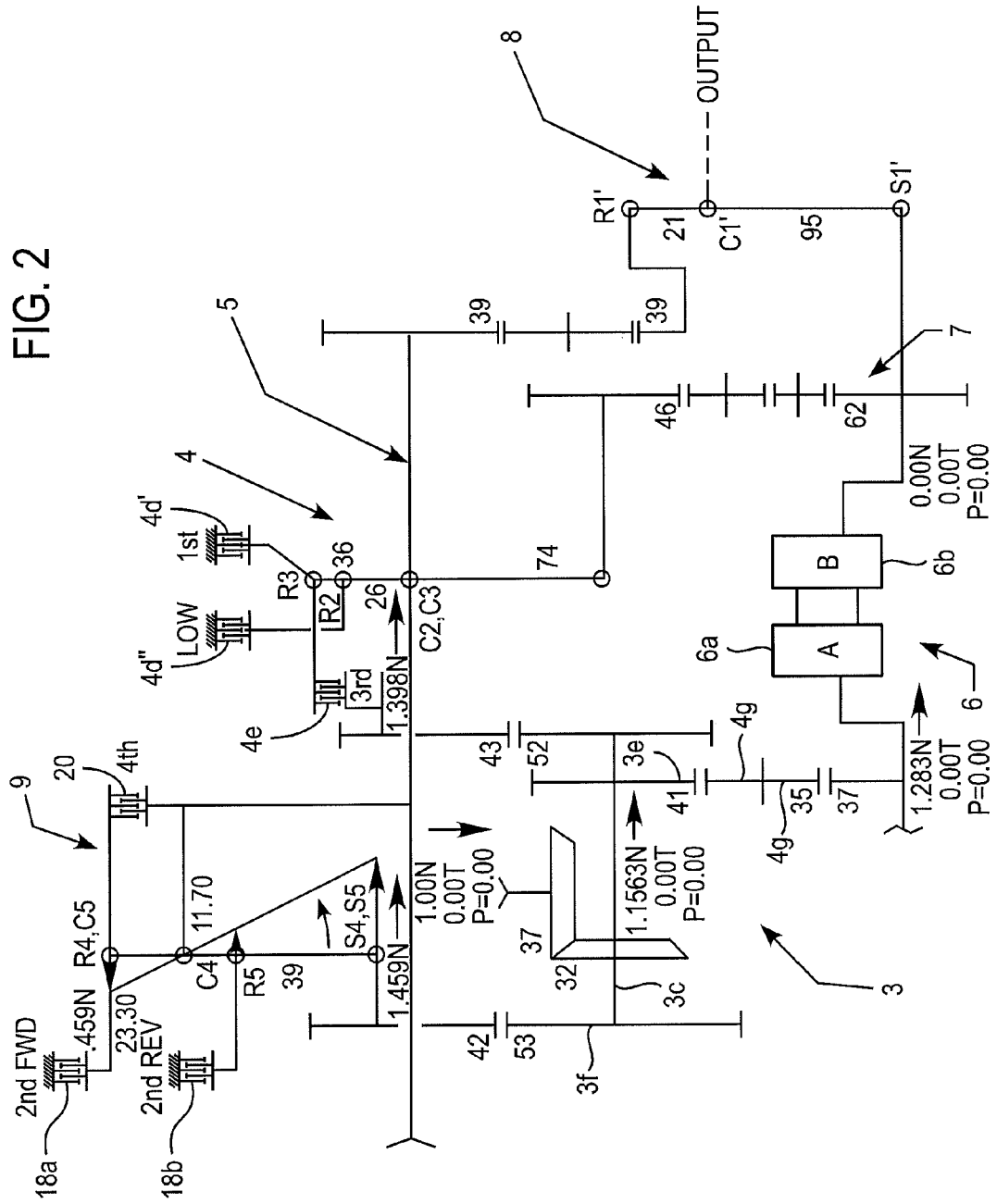
FIG. 2 through FIG. 21 are schematic lever analogy diagrams of the invention, which provide graphic analysis of transmission operation in each of the multiple ratio ranges. The sequence of figures are representative of increasing transmission output speed through upshifting of the ratio ranges. Decreasing output speed, or downshifting, is the reverse of this sequence.

FIG. 2 depicts the engagement of the engine through the actuation of the disconnect clutch 3a shown in FIG. 1a. In accordance with the previously stated convention, engine speed is shown as 1.00N. This engine speed is translated through the bevel gear and spur gear trains to sun gears S4, S5 in group 9, the hydrostatic assembly in group 6, and the lower portion of the 3rd range clutch 4e in group 4. Due to the number of gear teeth in each of these gear trains, the speeds at each of these junctures is different. However, their direction of rotation is toward the right and will be referred to as positive rotation. Since the hydrostatic assembly in group 6 is in its neutral position, a speed input to the "A" section will not induce a speed in the "B" section. Hence no input is delivered to gear train 7 or to sun gear S1' of group 8. With no transmission output by C1', ring gear R1' is also static with no rotation transferred to crossshaft 5. Additionally, since carrier C4 in group 9 is also connected to crossshaft 5, the effect of the 1.459N speed on sun gears S4, S5 will cause the lever of group 9 to rotate counterclockwise about C4 such that the speed of R4, C5 has a value of 0.459N in the negative direction. Simultaneously with the activation of the disconnect clutch, the 1st range brake 4d' was also energized. The operating condition shown in FIG. 2 is equivalent to the "drive" position in an automatic transmission equipped automobile without actuation of the throttle.

Still referring to FIG. 2, since there is no load on the transmission, both engine input torque and power are annotated as 0.00T and P=0.00 respectively in section 3.

Figure 3:
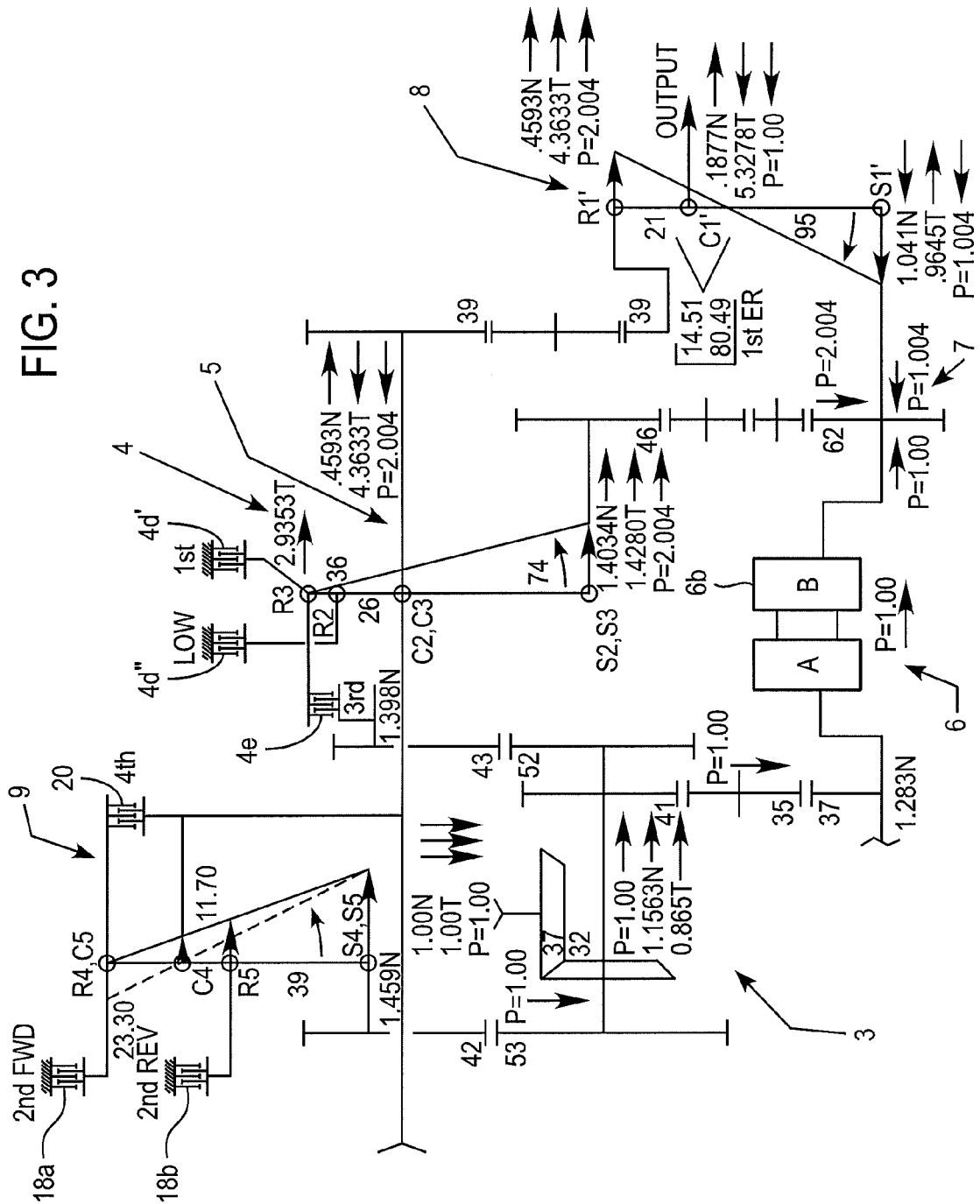

FIG. 3 shows transmission operation in 1st range. As in FIG. 2 the engine is engaged and 1st range brake 4d' is energized to prevent the rotation of ring gear R3. In addition, the "A" section of the hydrostatic assembly in group 6 is displaced such that a speed is induced in the "B" section in a negative direction until its speed reaches a maximum value of 1.041N on sun gear S1'. Similarly, this speed will translate through gear train 7 as a positive speed on sun gears S2, S3 in group 4. Since ring gear R3 is grounded to the transmission housing through its hydraulically energized disc brake, ring gear R3 cannot rotate. As a consequence, the rotation of sun gears S2, S3 at a speed of 1.4034N will cause the lever of group 4 to pivot about R3 in a counterclockwise direction; and cause the speed of C2, C3 to increase to 0.4593N in a positive direction.

Returning to the output planetary gearset in group 8, the speed of C2, C3 is transferred to ring gear R1' through crossshaft 5 such that ring gear R1' will rotate in a positive direction at a speed of 0.4593N. This speed, together with the negative 1.041N speed at S1', will result in carrier C1' rotating at 0.1877N in the positive direction. The lever of group 8 is shown as rotating in the clockwise direction. The crossover point at which the rotated lever attains zero speed is calculated by line slope and is shown in group 8 as 14.51/80.49. This is referred to as equivalent ratio and represents the vertical spacing between positive and negative speed direction of the lever between C1' and S1'. These equivalent tooth values sum to the 95 gear teeth on ring gear R1' as represented by the distance between C1' and S1'. The importance of the equivalent ratio point will be highlighted later in this disclosure.

Returning again to output carrier C1' which represents the total output of the transmission, the power on carrier C1' can be stated as equivalent to the input power of P=1.00 but in a negative direction such that the overall transmission is in equilibrium; wherein power output is equal to input power as a output reaction to the input action. All internal transmission losses are neglected to simplify calculations. Similarly, output torque may be calculated as the inverse of carrier C1' speed at a value of 5.3278 T such that the equation (0.1871N) (5.3278 T)=1.00 P is determined. The torque at carrier C1' is also in a negative direction in order to attain equilibrium of these forces acting upon the transmission.

With the power and torque values now determined on carrier C1', the torque value on sun gear S1' may be calculated the by summation of moments about R1' by using the gear tooth counts of 21 and 95 as shown on the output lever such that the torque on sun gear S1 is determined to be 0.9645T. This value is in a positive direction so as to react the torque direction on carrier C1'. Similarly, summation of the moments about sun gear S1' will determine the torque on ring gear R1' to be 4.3633 T; and is also in a positive direction to resist carrier C1' torque. Now, calculating power at sun gear S1' as the product of speed×torque, (1.041N)(0.9645 T)=1.004 P; and similarly for ring gear R1': (0.4593N)(4.3633 T=2.004 P. Since the sum of the powers on the output planetary lever must result in equilibrium, the power at sun gear S1' is in a negative direction; while the power at ring gear R1' is in a positive direction.

The torque and power values on ring gear R1' are now transferred through spur gearing to crossshaft 5 and into carrier C2, C3 of group 4. In order to maintain equilibrium through crossshaft 5, the torque and power acting on carrier C2, C3 must be opposite to those values developed on ring gear R1'. Consequently, and still maintaining equilibrium, the torque at sun gears S2, S3 is calculated by the sum of the moments about R3 to be 1.4280 T by using the number of gear teeth of 36 and 74 on the lever. When multiplied by the speed of S2, S3 the power transferred from the sun gear to gear train 7 is determined to be: (1.4034N)(1.4280 T)=2.004 P. This value is equal and opposite to the power acting on carrier C2, C3. Completing the force balance is the reaction torque of 2.9353 T at ring gear R3. Since no speed is present at the ring gear, there is no power developed.

Since crosshaft 5 is rigidly affixed to carrier C4 in group 9, the speed of carrier C4 has also attained a speed of 0.4593N in the positive direction. This action has caused ring gear and carrier R4, C5 to decrease its speed from a negative direction of 0.459N to zero. This action is indicated by rotation of the lever clockwise about the sun gears S4, S5. As will be further revealed, the point at which ring gear and carrier R4, C5 reach zero speed is the 1st to 2nd range shift point.

Returning again to FIG. 3, it is noted that the juncture of hydrostatic assembly group 6, gear train 7, and output planetary group 8 shows a summation of the relative power flows such that their magnitudes and directions cancel one another. This, too, is a state of equilibrium. Also noted is that all engine input power of P=1.00 is delivered through the hydrostatic assembly; whereas the other powers are generated by the interaction of the gearing system. Of particular note is that the power in gear train 7 is more than twice that of input power. The method by which these, and other, regenerative power levels are utilized to enhance overall transmission performance will be further revealed.

Figure 4:
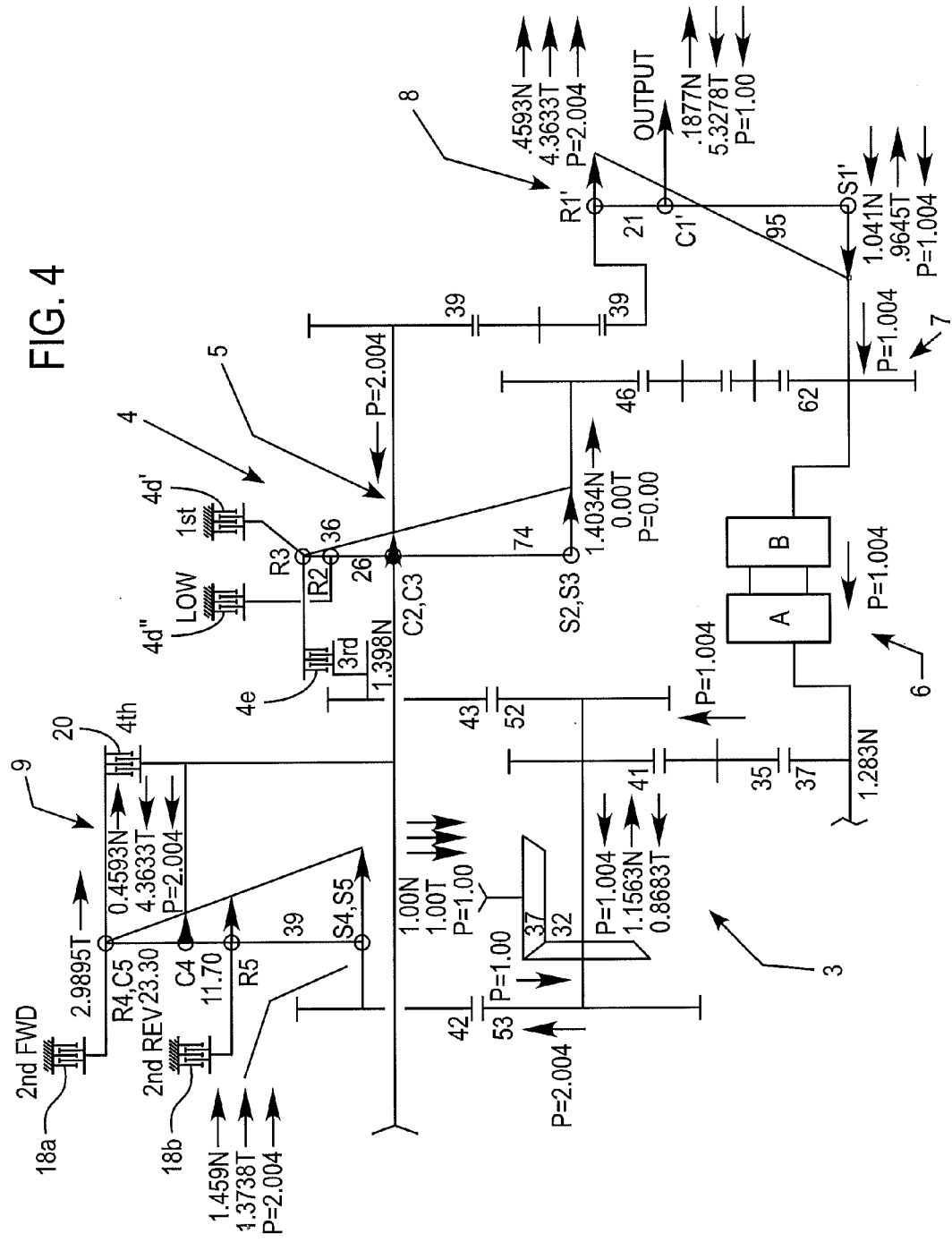

Whereas FIG. 3 depicts the transmission operational state in 1st range at the 1st to 2nd FWD range shift point; FIG. 4 illustrates the 2nd FWD range operating condition at the shift point. The actual range shift is achieved by releasing 1st range brake 4d' simultaneously with the actuation of the 2nd FWD range brake 18a on ring and carrier R4, C5. Of note is that neither engine input nor the conditions on the output planetary gearset group 8 have changed. Since neither engine speed nor engine torque was altered by the 1st to 2nd FWD shift, this is referred to as a synchronous shift as opposed to the step-shift characteristics of all other automatic transmissions; and was a significant feature of the aforementioned Reed Patent.

With the shift into 2nd FWD range as shown in FIG. 4 no loading conditions can be reacted by the gearsets in group 4, and the loading transferred by crossshaft 5 must be reacted by the components in group 9. This is achieved by carrier C4 that is rigidly affixed to crossshaft 5 through the reaction of 2nd FWD brake 18a which grounds ring gear and carrier R4, C5 to the transmission housing. Again, as in FIG. 3, the torque values and their directions can be calculated by summation of the moments about points R4, C5 and S4, S5. These calculations yield a torque value of 1.3738 T at S4, S5; which, when multiplied by the speed of 1.459N, will yield a power of P=2.004.

Returning now to the output planetary gearset of group 8, the negative power flow from sun gear S1' passes through the junction with gear train 7 and goes through the hydrostatic assembly of group 6. This is a reversal of the power flow shown in FIG. 3 and is representative of regenerative power. This power is transferred through spur gearing to the input section 3 where it is added to the direct power delivered from the engine. These two powers, of P=1.004 and P=1.00 respectively, are summed to equal the P=2.004 power requirement at S4, S5 in group 9. As in FIG. 3, internal transmission losses have been neglected to simplify calculation; and equilibrium on all functions has been achieved.

The nearly identical values for hydrostatic power flow both before and after the 1st range to 2nd FWD shift is referred to as power match; and in this example are nearly perfect. The importance of this characteristic will be further revealed herein.

After shifting into 2nd FWD range, the action of the hydrostatic assembly in group 6 will cause the speed of the "B" section to slow until it achieves a zero output speed at sun gear S1'. This operating condition is shown in FIG. 5.

Figure 5:
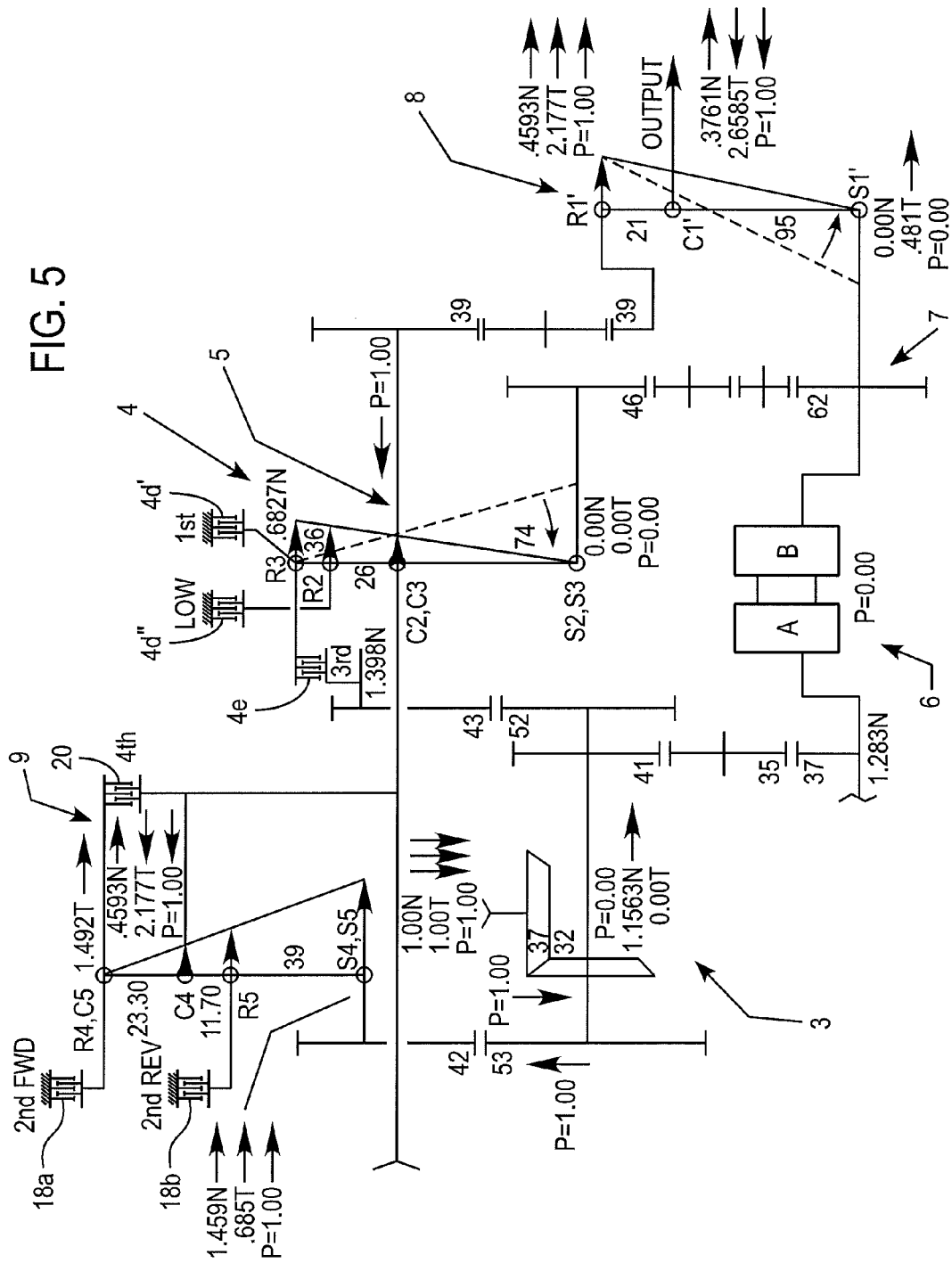

The output planetary gearset in FIG. 5 shows that the speed of sun gear S1' has been reduced to zero by the action of the hydrostatic assembly of group 6. As a result, the lever of the planetary gearset has rotated counterclockwise about ring gear R1'; which has been held steady by the action of the 2nd FWD brake through crossshaft 5. This action has caused carrier C1' to increase its speed to 0.3761N. And since output power must equal input power for equilibrium, the torque reaction at carrier C1' is calculated to be 2.6585 T. The reduction in the speed of the hydrostatic assembly "B" section has also reduced the speed of gear train 7 and sun gears S2, S3 in group 4 to zero. Consequently, the lever of the planetary gearsets in group 4 has been rotated clockwise about carriers C2, C3 such that the speed of ring gear R3 has been increased from zero to a value of 0.6827N in a positive direction.

Still referring to FIG. 5, the torque reactions on ring gear R1' and sun gear S1' may be calculated by the sum of the moments about S1' and R1' respectively. Since there is no speed component at sun gear S1', no value for power can be calculated and hence P=0.00 at sun gear S1'. Similarly, the power at ring gear R1' is calculated to be P=1.00 and confirms that the output planetary gearset group 8 to be in equilibrium. The loading thus determined on ring gear R1' is transferred through crossshaft 5 to carrier C4 of group 9. Since the 2nd FWD brake 18a is applied, there is no speed component at ring gear and carrier R4, C5. Furthermore, calculating the sum of the moments about this point will determine the torque reaction at sun gears S4, S5 to be 0.685 T. Multiplying this value by the speed of sun gears S4, S5 will yield (1.459N) (0.685 T)=1.00 P. And together with the torque reaction component of 1.492 T at ring gear and carrier R4, C5, equilibrium is established in the lever of group 9. Since no power is transferred from sun gear S1' through the hydrostatic group 6, all engine power is transferred through the input section 3 to group 9. In this operating condition, the power flow through the transmission is totally mechanical in nature; with no hydrostatic or regenerative contribution.

FIG. 5 illustrated the condition where the "B" section of the hydrostatic assembly had decreased its speed from a negative direction to a zero speed condition. This action of the "B" section now continues with the speed increasing, after passing through zero, in a positive direction until the speed approaches the 2nd FWD to 3rd range shift point as shown in FIG. 6.

Figure 6:
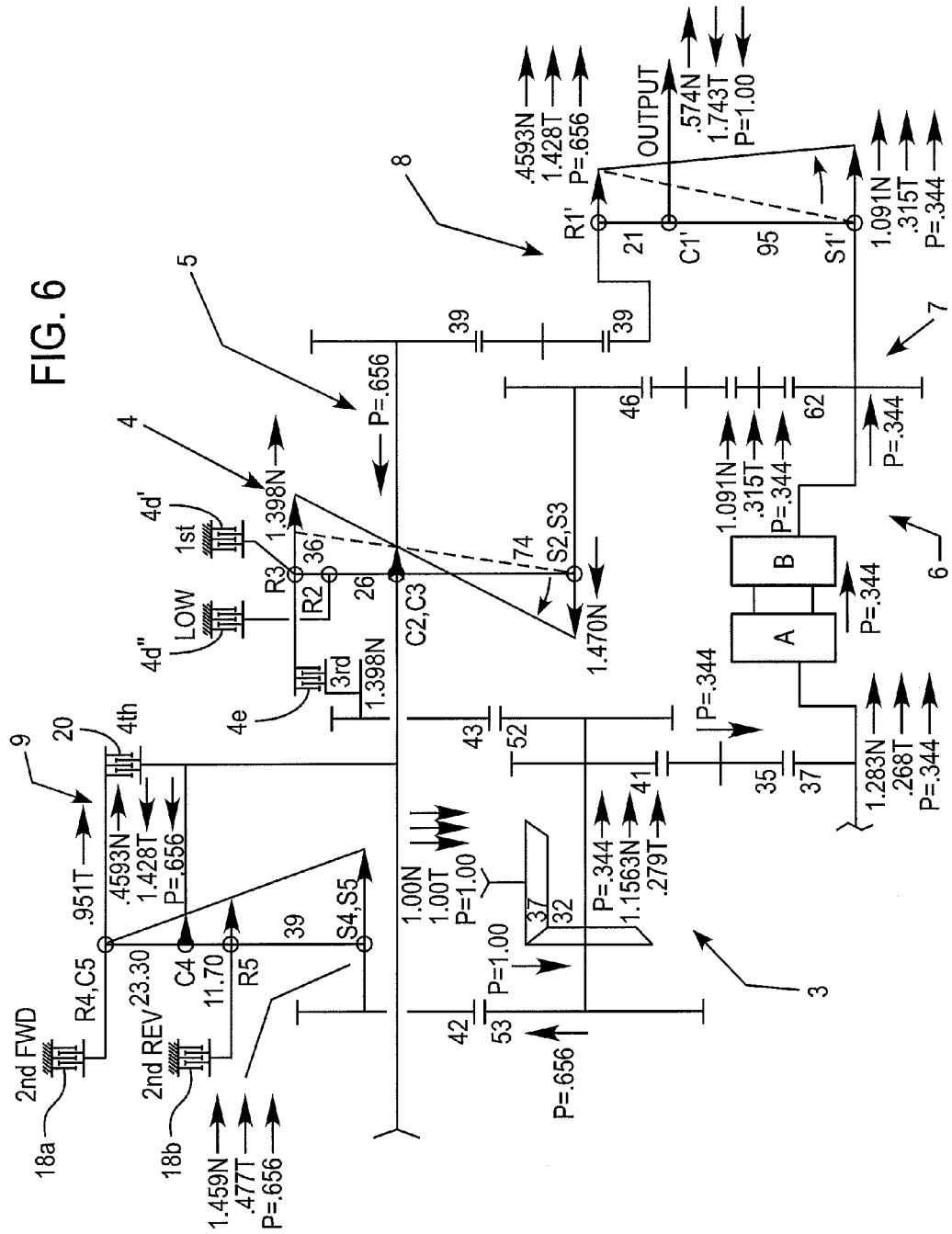

The output planetary gearset in FIG. 6 shows that the speed of sun gear S1' has increased in a positive direction to a value of 1.091N by the action of the hydrostatic assembly 6. As a result, the lever of output planetary gearset group 8 has rotated about ring gear R1'; which has been held steady by the action of the 2nd FWD brake 18a through crossshaft 5. This action has caused output carrier C1' to increase its speed to 0.574N. And, since output power must equal input power for equilibrium, the torque reaction at carrier C1' is calculated to be 1.743 T. The speed increase of the hydrostatic assembly "B" section has also increased the speed of gear train 7 and sun gears S2, S3 in group 4 to a value of 1.470N in the negative direction. Consequently, the lever of the planetary gearsets in group 4 has been rotated clockwise about carriers C2, C3 such that the speed of ring gear R3 has increased to a value of 1.398N in the positive direction. Since ring gear R3 is rigidly affixed to the upper section of the 3rd range clutch, this portion of the clutch is also rotating at a speed of 1.398N.

Returning to the output planetary gearset 8 shown in FIG. 6, the torque reactions on ring gear R1' and sun gear S1' may be calculated by the sum of the moments about S1' and R1' respectively. Further calculating the power values at each of these components will show a power split of P=0.656 at ring gear R1' and P=0.344 at sun gear S1'. This latter value is generated by the hydrostatic assembly; while the former power was developed through the gearing system. The power and torque levels of the components in group 9 have also decreased through the power contribution of the hydrostatic assembly.

Figure 7:
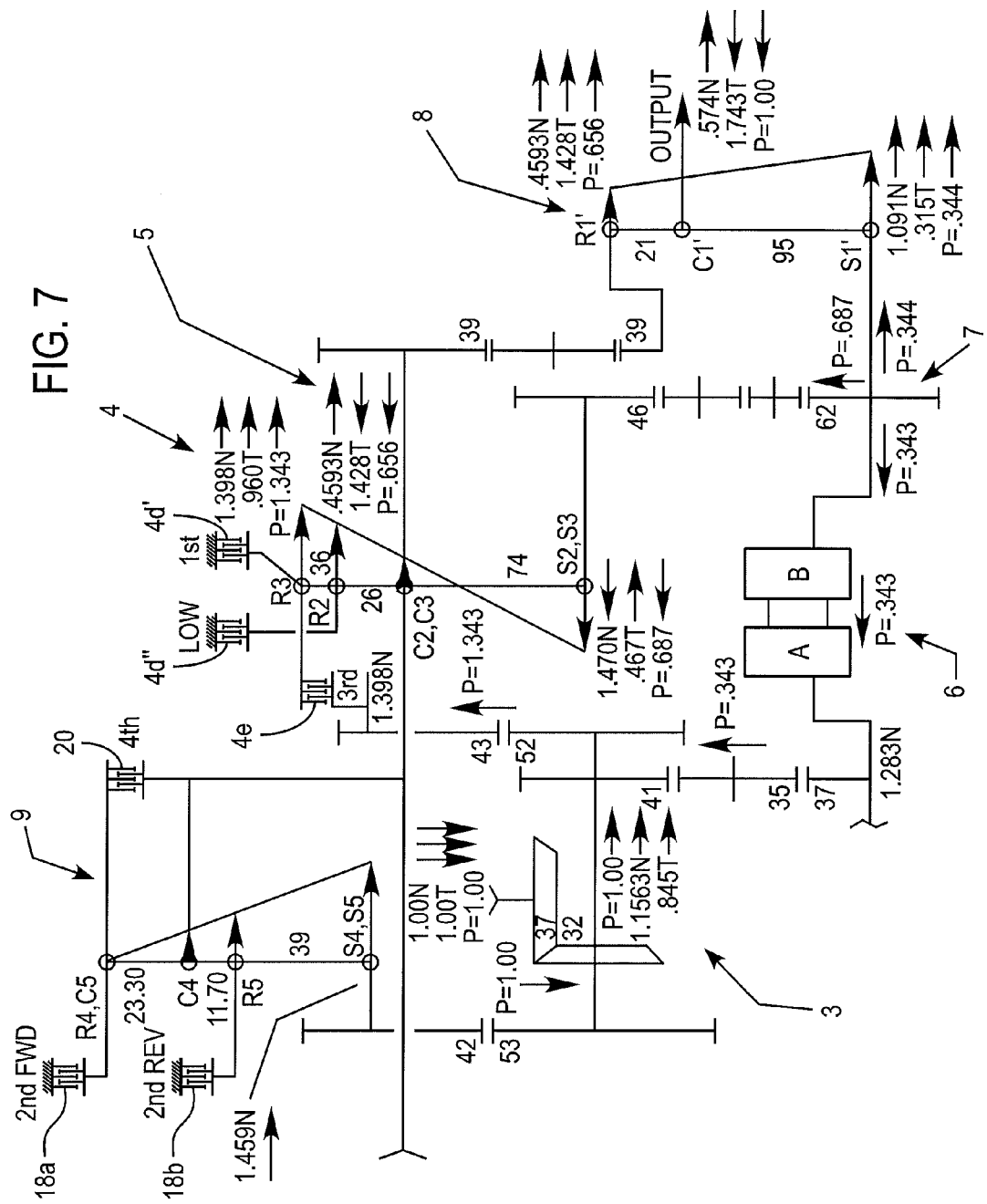

Whereas FIG. 6 depicts transmission operation in 2nd FWD range at the 2nd FWD to 3rd range shift point; FIG. 7 illustrates the 3rd range operating condition at the shift point. The actual range shift is achieved by releasing 2nd FWD brake 18a simultaneously with the actuation of the 3rd range clutch as shown in group 4. Since the upper section of the clutch is connected to ring gear R3 with a speed of 1.398N, and the lower section of the 3rd range clutch is also rotating at a speed of 1.398N as driven by the rightmost spur gear from input section 3, the actuation of the 3rd range clutch 4e will rigidly connect the input to ring gear R3. Because these speeds are identical, this is also a synchronous shift and neither engine speed nor torque was altered by the range shift from 2nd FWD to 3rd.

With the shift into 3rd range as shown in FIG. 7, the load reactions by the planetary gearsets in group 9 are released and transferred through crossshaft 5 to the carrier C2, C3 in group 4. And again as previously revealed in this discussion, the torque values and their directions can be calculated by summation of moments about points R3 and S2, S3. These calculations yield a torque value of 0.467 T at sun gears S2, S3; which when multiplied by their speed of 1.470N, will yield a power of P=0.687. In a like manner the power at ring gear R3 is determined to be P=1.343. The direction of these power flows in group 4 show that equilibrium is again achieved at the lever.

In FIG. 7 it is noted that the juncture of hydrostatic assembly 6, gear train 7, and sun gear S1' of output planetary 8 shows the summation of the relative power flows such that their magnitudes and directions again cancel each other as in FIG. 3. However the power flow direction through the hydrostatic assembly is opposite that shown in FIG. 6 and of a slightly lower magnitude of P=0.343 rather than the previous P=0.344. As at the 1st to 2nd FWD shift point, this is also an example of power matching. And, similarly to the regenerative power shown in FIG. 4, this power is transferred through the hydrostatic assembly to the input section 3 where it is added to the direct power delivered from the engine. These two powers, of P=0.343 and P=1.00 respectively, are summed and transferred through the spur gearing and the 3rd range clutch to ring gear R3.

After shifting into 3rd range, the action of the hydrostatic assembly in group 6 will cause the speed of the "B" section to reverse direction and decrease its speed until it achieves a zero output speed at sun gear S1'. This operating condition is shown in FIG. 8.

Figure 8:
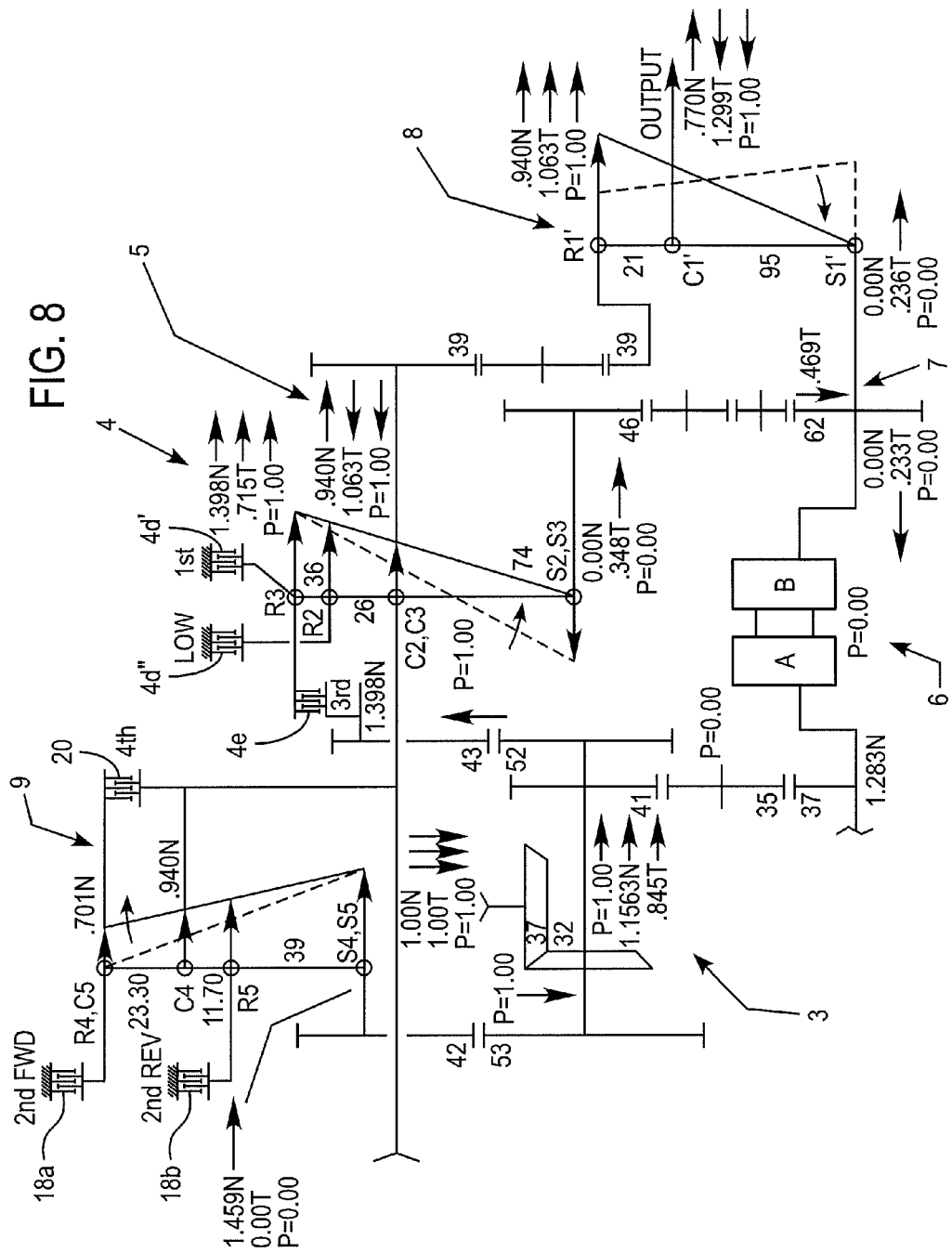

The output planetary gearset in FIG. 8 shows that the speed of sun gear S1'has been reduced to zero by the action of the hydrostatic assembly of group 6. As a result, the lever of the planetary gearset 6 has rotated clockwise as shown by the dotted line of the planetary lever. This rotation was induced by the increase in speed of ring gear R1' as well as by the decrease in speed of sun gear S1'. The increase in ring gear R1' speed was generated by the planetary gearsets in group 4 as also shown by the dotted line of that planetary lever. This action was caused by reducing the speed of sun gears S2, S3 through gear train 7 such that the lever in group 4 is rotated in a counterclockwise direction about ring gear R3 thus causing carriers C2, C3 to increase the speed of crossshaft 5 and subsequently ring gear R1. In effect, the speed reduction generated by the hydrostatic assembly causes a reduction in speed of both sun gear S1' and sun gears S2, S3 but in opposite directions due to the two idler gears in gear train 7.

Still referring to FIG. 8, the output speed of carrier C1' has been increased to 0.770N by the actions of sun gear S1' and ring gear R1'. As previously revealed, the torque and power values at both sun gear S1' and ring gear R1' can be calculated. These values of ring gear R1' are similarly reacted at carriers C2, C3 through crossshaft 5; and the loadings on ring gear R3 and sun gears S2, S3 determined by the summation of moments about sun gears S2, S3 and ring gear R3 respectively. It is also noted that there is no power flow through hydrostatic assembly 6 due to the absence of a speed value at the "B" section. However, the hydrostatic assembly must react a torque of 0.233 T as a result of the regenerative torque developed at sun gears S2, S3 and transferred through gear train 7. The junction of groups 6, 7, and 8 show that their torques are in equilibrium in magnitude and direction. Since no power is flowing through the hydrostatic assembly, transmission operation is solely mechanical in nature.

It will be noticed in group 9 of FIG. 8 that the increasing speed of carriers C2, C3 in group 4 has also caused carrier C4 of group 9 to increase to a similar speed. This will cause the lever of the planetary gearsets to rotate clockwise about sun gears S4, S5 such that the speed of ring gear R4 and carrier C5 increases to a speed of 0.701N in the positive direction. Also of note is that the lower section of the 4th range clutch 20 shown in group 9 is affixed to carrier C4; whereas the upper section of the 4th range clutch is connected to ring gear R4 and carrier C5. No load is transferred through the planetary gearsets of group 9 as indicated by lack of torque or power values on any of the components.

FIG. 8 illustrates the condition where the "B" section of the hydrostatic assembly had decreased its speed from a positive direction to a zero speed condition. This action of the "B" section now continues with its speed increasing, after passing through zero, in a negative direction until the speed approaches the 3rd to 4th range shift point as shown in FIG. 9.

Figure 9:
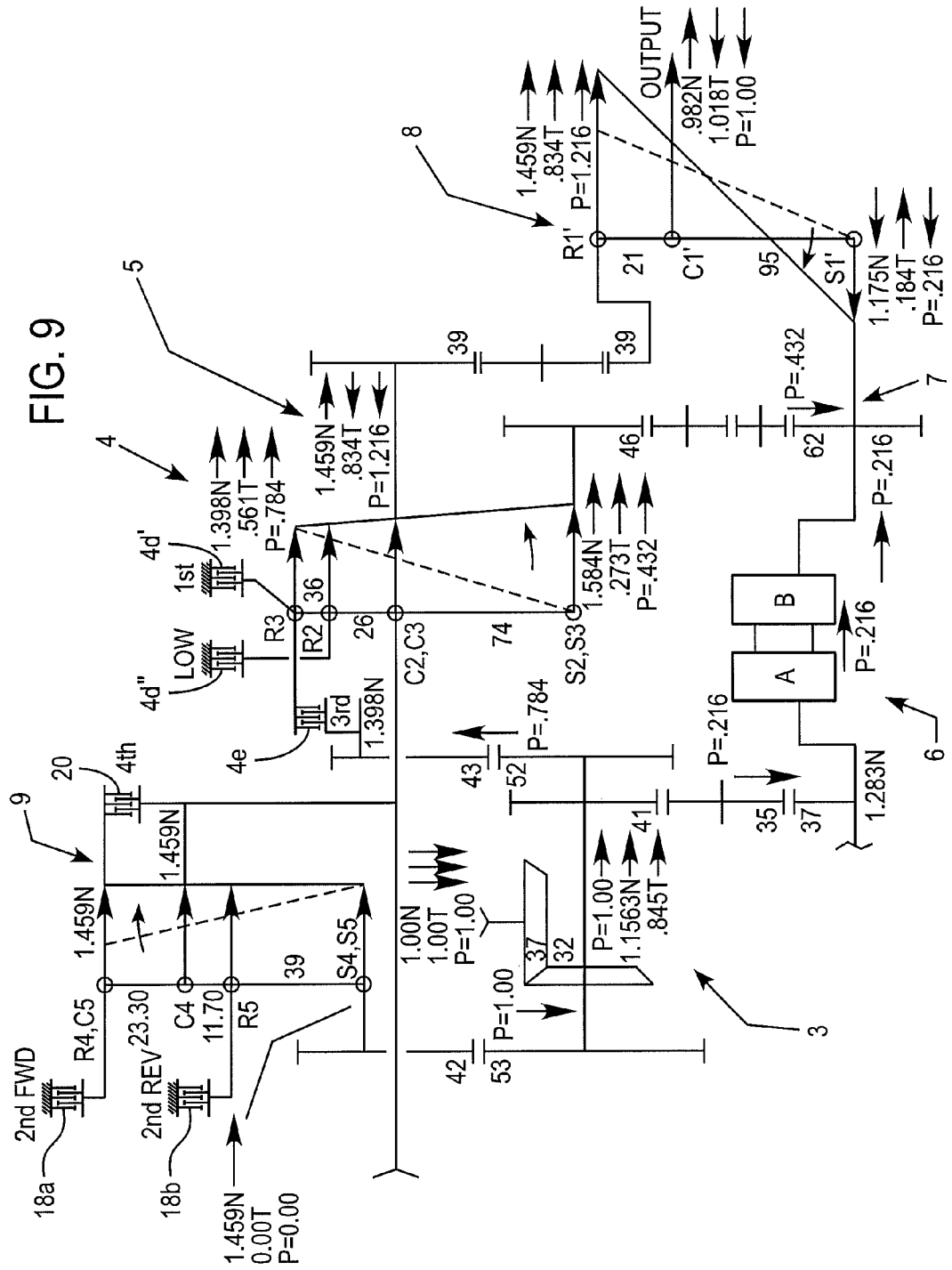

The output planetary gearset in FIG. 9 shows that the speed of sun gear S1' has increased in a negative direction to a value of 1.175N by the action of the hydrostatic assembly 6. As a result, the lever of the output planetary gearset 8 has continued to rotate in a clockwise direction through the actions of sun gear S1' and ring gear R1' as shown by the dotted line of the planetary lever. The increasing speed of ring gear R1' was driven by the action of the planetary gearsets in group 4; wherein in increasing positive speed of sun gears S2, S3, driven by gear train 7, caused the planetary lever to rotate counterclockwise about ring gear R3, as is also shown by the dotted line of that lever. This action increased the speed of crossshaft 5 to a value of 1.459N that was transferred to ring gear R1'. In addition, the speed of crossshaft 5 also increased the speed of carrier C4 such that the lever of the planetary gearsets in group 9 was rotated in a counterclockwise direction about sun gears S4, S5. It will be noticed that all of the component speeds of group 9 have attained an equal value of 1.459N.

Returning to the output planetary gearset 8, the speeds of sun gear S1' and ring gear R1' has resulted in a speed of 0.982N on output carrier C1'. By applying the methods previously revealed herein, the torque and power levels on the components of the output planetary gearset can be readily determined. In a similar fashion, the loads on the planetary gearsets in group 4 may be calculated and are shown in FIG. 9. And again, an equilibrium condition is established on all planetaries as well as the juncture of group 6, 7, and 8; with a direct power of P=0.216 being supplied through hydrostatic assembly 6.

Figure 10:
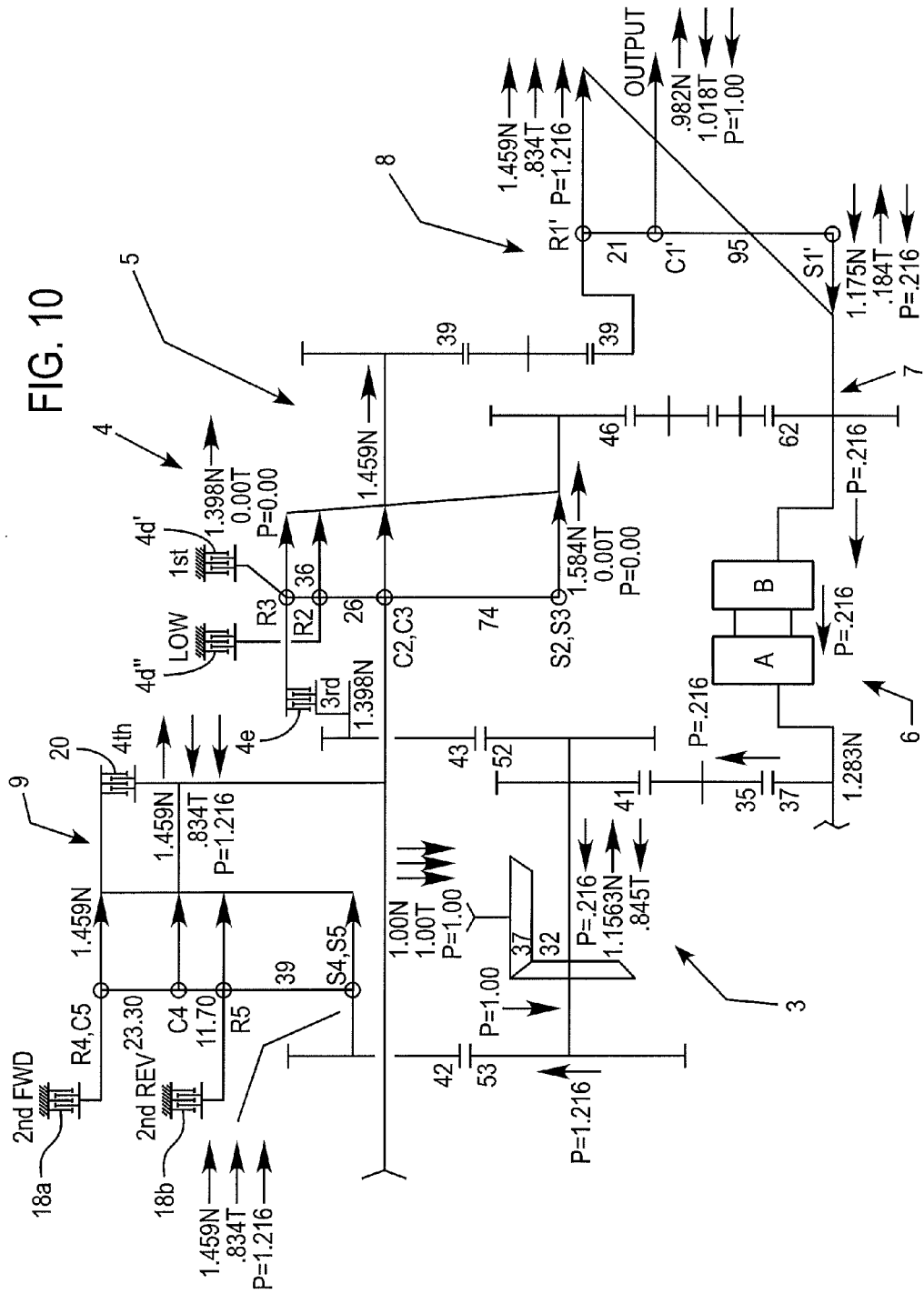

Whereas FIG. 9 depicts transmission operation in 3rd range at the 3rd to 4th shift point; FIG. 10 illustrates the 4th range operating conditions at the shift point. The actual range shift is achieved by releasing 3rd range clutch 4e simultaneously with the actuation of the 4th range clutch 20 in group 9. Since both the upper and lower portions of the fourth range clutch are rotating at the same speed, the shift is synchronous and neither engine speed nor torque was altered by the shift.

With the shift into 4th range as shown in FIG. 10, the load reactions by the planetary gearsets in group 4 are released and transferred through crossshaft 5 to carrier C4 in group 9. By actuating the 4th range clutch 20, two sections of the lever were effectively rigidly interconnected. Because no relative rotation of any component is possible, all components of the planetary gearsets in group 9 are locked together and rotate at the same speed. To maintain equilibrium, it may be simply stated that the speed torque and power values applied to sun gears S4, S5 are transferred through carrier C4. However, a more detailed explanation is provided in connection with FIG. 11.

Figure 11:
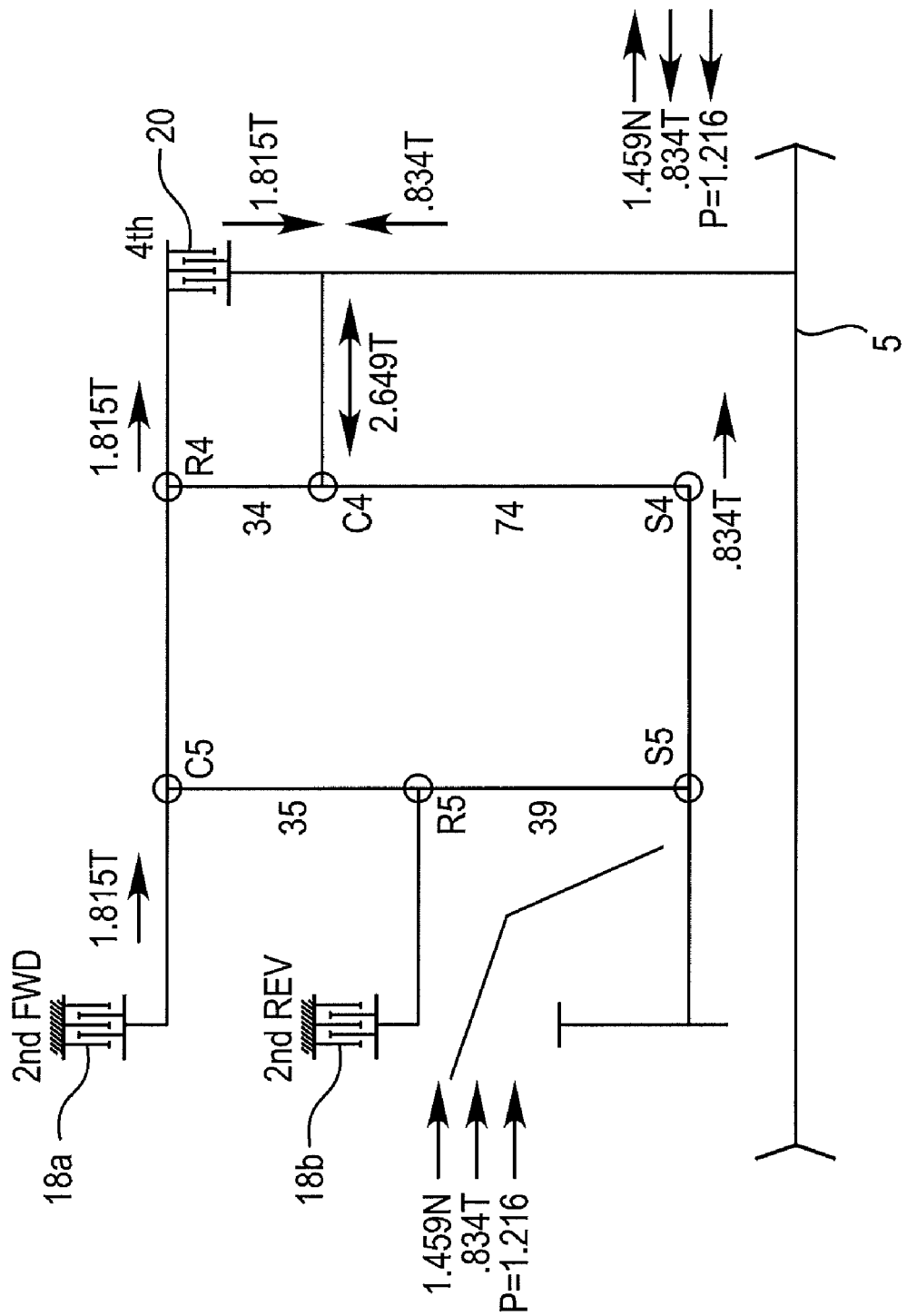

FIG. 11 shows the two planetary gearsets of group 9 divided into their two separate levers. Since there is no loading on the planetary S5, R5, C5 but rather entirely on the planetary S4, C4, R4; their torque values may be calculated by the summation of moments about sun gear S4 which will yield the torque values of 1.815 T on ring gear R4 and 2.649 T on carrier C4. However, since all torque values and directions must be in equilibrium at the juncture of the 4th range clutch with the output of carrier C4, these torque will yield a resultant torque of 0.834 T being applied to crossshaft 5. This example graphically illustrates that the torque to be accommodated by the 4th range clutch 20 is 1.815 T, which is more than twice the output torque of the planetary gearsets in group 9 when taken as a whole.

Returning to FIG. 10, it is noted that the parameters of the output planetary gearset 8 have remained unchanged from those values shown in FIG. 9. However, since the planetary gearsets of group 4 have been released, no power is flowing through gear train 7, with the result that the power developed by sun gear S1' will flow in a regenerative manner through the hydrostatic assembly and hence be delivered to the input section 3 and finally to sun gears S4, S5. And, as previously noted at the preceding shift points, the power flow through the hydrostatic assembly 6 has reversed direction but retained the same value as in FIG. 9 of P=0.216; thus indicating that the shift was power matched.

After the shift into 4th range as shown in FIG. 10, the action of the hydrostatic assembly in group 6 will cause the speed of the "B" section to reverse direction and decrease its speed until it achieves a zero output speed at sun gear S1'. This operating condition is shown in FIG. 12.

Figure 12:
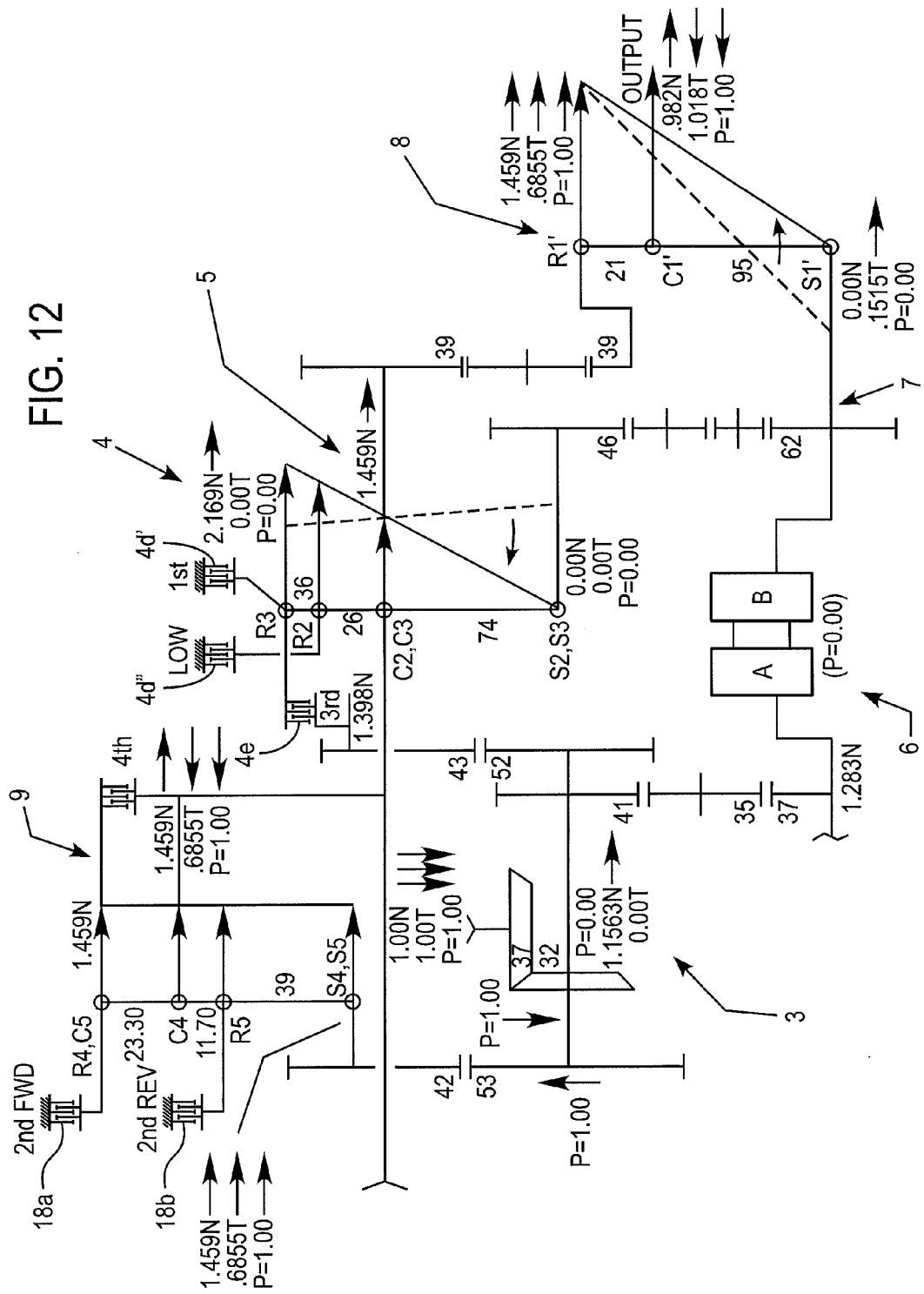

The output planetary gearset in FIG. 12 shows that the speed of sun gear S1' has been reduced to zero by the action of the hydrostatic assembly of group 6. As a result, the lever of the planetary gearset 8 has rotated in a counterclockwise direction about ring gear R1' as shown by the dotted line of the planetary lever. This action will cause the speed of carrier C1' to increase in speed to 0.982N. And, as previously revealed, the torque and power values at both sun gear S1' and ring gear R1' may be calculated. These values of ring gear R1' are similarly transferred through crossshaft 5 and reacted by carrier C4 of the planetary gearsets in group 9. It is again noted that there is no power flow through the hydrostatic assembly 6, but that "B" section must react a torque of 0.1515 T as a result of the torque on sun gear S1'.

It will be noticed that the lever of the planetary gearsets in group 4 has also rotated in a clockwise direction about carriers C2, C3 as shown by the dotted line of the lever. This action was similarly caused by reducing the speed of the "B" section such that the speed at sun gears S2, S3 are also zero. There is power flow through gear train 7 nor through the hydrostatic assembly 6. In this operating condition, all power flow through the transmission is mechanical in nature.

FIG. 12 illustrates the 4th range operating condition where the "B" section of the hydrostatic assembly has decreased its speed from a negative direction to a zero speed condition. This action of the "B" section will now continue with the speed increasing, after passing through zero, in a positive direction until the maximum output speed of the transmission is attained as shown in FIG. 13.

Figure 13:
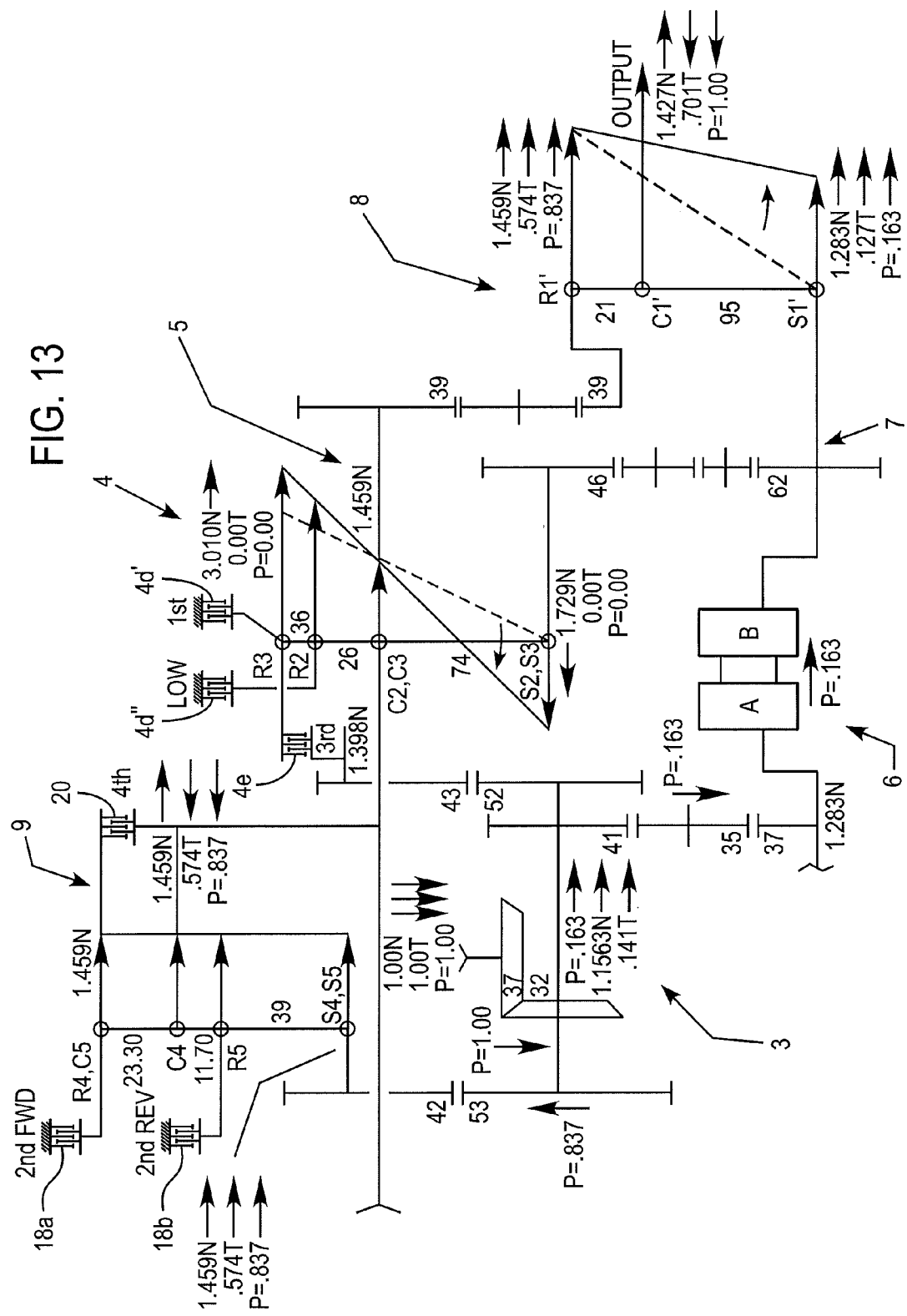

The output planetary gearset 8 in FIG. 13 shows that the speed of sun gear S1' has increased in a positive direction to a value of 1.283N by the action of hydrostatic assembly 6. As a result, the planetary lever has continued to rotate in a counterclockwise direction about ring gear R1' and as shown by the dotted line of the lever. This action has further caused output carrier C1' to reach a speed of 1.427N; and is the maximum speed that the transmission will produce. And again, all torque, speed, and power values on the elements of planetary gearset 8 may be determined by the methods previously revealed. The increase in speed has also caused the lever of the planetary gearsets in 4 to rotate further in a clockwise direction about carriers C2, C3 until the maximum speeds of its components are also attained. In addition, ring gear R1' continues to be driven through crossshaft 5 by the planetary gearsets in group 9 and the activation of the 4th range clutch 20.

While the forgoing series of illustration have been presented in a manner of sequentially increasing output speed from 1st through 4th ratio ranges, the inverse of this sequence would apply for decreasing output speed. That is, the transmission would progressively downshift through each range as speed was reduced.

As illustrated previously, the "B" section of the hydrostatic assembly in group 6 is bi-directional; that is, it can generate speed in both a positive and negative direction. Hence, 1st range reverse operation is simply achieved by energizing the 1st range brake 4d' in group 4 and inducing a positive speed direction on sun gear S1'. This operating condition of 1st range reverse is shown in FIG. 14.

Figure 14:
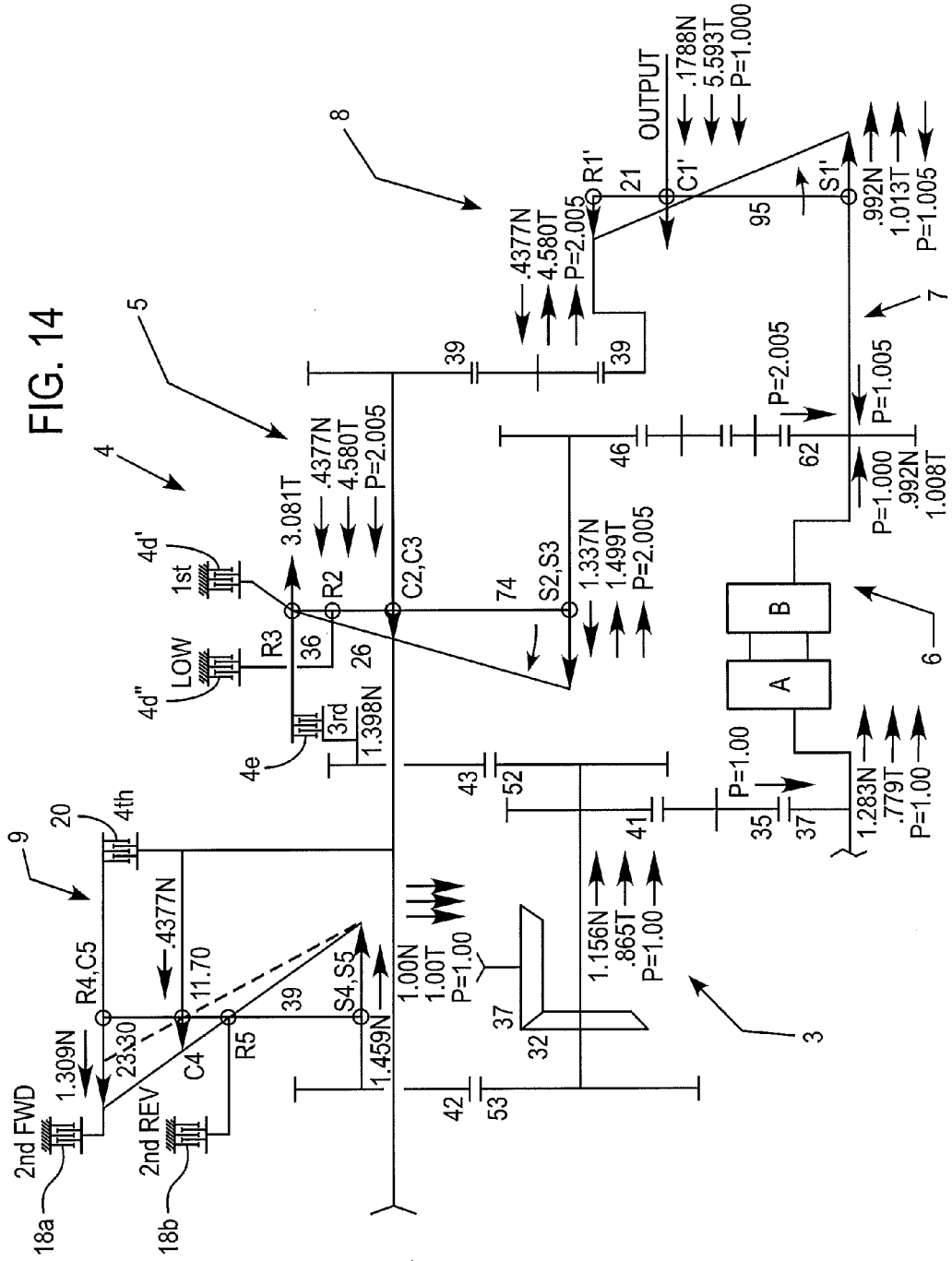

The output planetary gearset 8 in FIG. 14 shows that the sun gear S1' has increased its speed in a positive direction to a value of 0.992N by the action of the hydrostatic assembly 6. Similarly, this speed will translate through gear train 7 as a negative speed on sun gears S2, S3 in group 4. Since ring gear R3 is grounded to the transmission housing through its hydraulically energized disc brake, ring gear R3 cannot rotate. As a consequence, the rotation of sun gears S2, S3 at a speed of 1.337N will cause the lever in group 4 to pivot about ring gear R3 in a clockwise direction; and subsequently cause the speed of C2, C3 to increase to 0.4377N in a negative direction.

Returning to the output planetary gearset in group 8, the speed of C2, C3 is transferred to ring gear R1' through crossshaft 5 such that ring gear R1' will also rotate in a negative direction at a speed of 0.4377N. This speed, together with the positive 0.992N speed at sun gear S1', will result in carrier C1' rotating at 0.1788N in a negative direction; with the lever of the output planetary gearset in group 8 shown rotating in a counterclockwise direction. By the methods previously revealed herein, the appropriate speed, torque, and power values may be determined for all of the components of the output planetary. Similarly, the speed, torque, and power values at the planetary gearsets in group 4 may be calculated such that the power levels at the junction of groups 6, 7, and 8 are determined to be in equilibrium. As in 1st range forward there is a regenerative power loop between planetary groups 4 and 8 at a value of P=2.005. However, the power flow through the hydrostatic assembly 6 flows directly from the engine and input section 3 at a value of P=1.00.

Also noted in FIG. 14 is that the negative speed of 0.4377N on crossshaft 5 has driven carrier C4 of planetary group 9 in the negative direction such that its lever has rotated in a counterclockwise direction about sun gears S4, S5. This action has resulted in ring gear R5 reaching a zero speed value.

Figure 15:
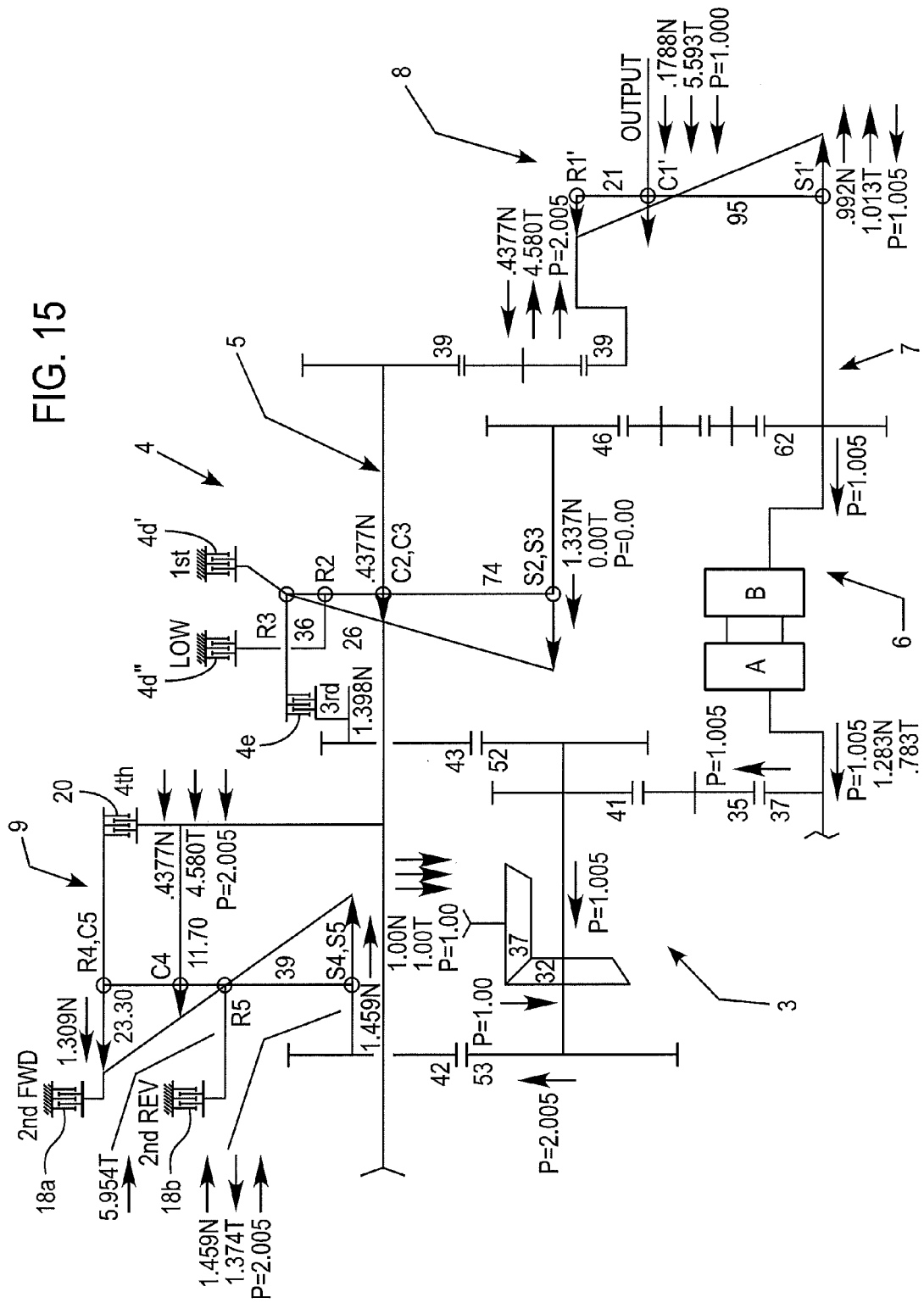

Whereas FIG. 14 illustrates the transmission operating condition in 1st range reverse at the 1st reverse to 2nd REV shift point, FIG. 15 illustrate this condition in 2nd range reverse. The shift from 1st range reverse to 2nd range reverse is achieved by simultaneously releasing the 1st range brake 4d' while actuating the 2nd REV brake 18b. As with the other brake features of the transmission, 2nd REV brake 18b is a hydraulically energized disc brake rigidly affixed to ring gear R5.

With the shift into 2nd REV as shown in FIG. 15 no loading conditions can be reacted by the gearsets in group 4, and the loading transferred by crossshaft 5 must be reacted by the components in group 9. This is achieved through the reaction of the 2nd REV brake 18b which grounds ring gear R5 to the transmission housing. By summation of moments about the lever in group 9 the torque reaction at ring gear R5 is calculated to be 5.954 T. It will be further noted that the loading of the components of output planetary gearset 8 have not been altered by the shift into 2nd REV; but that the reactions from sun gear S1' are transferred through the hydrostatic assembly in group 6 such that the power flow has reversed, and is of slightly higher value, than the hydrostatic power generated in FIG. 14. This regenerative power is transferred through the input section 3 and is ultimately delivered to sun gears S4, S5. The shift from 1st range reverse to 2nd REV was nearly power matched at a value of P=1.005 as compared to P=1.00 in FIG. 14. Because of the arrangement of the planetary gearsets in group 9, an internal regenerative power loop is created within the elements of the two gearsets which will be further explained in connection with FIG. 16. As revealed in FIG. 11 the load levels on these elements can be unexpected.

Figure 16:
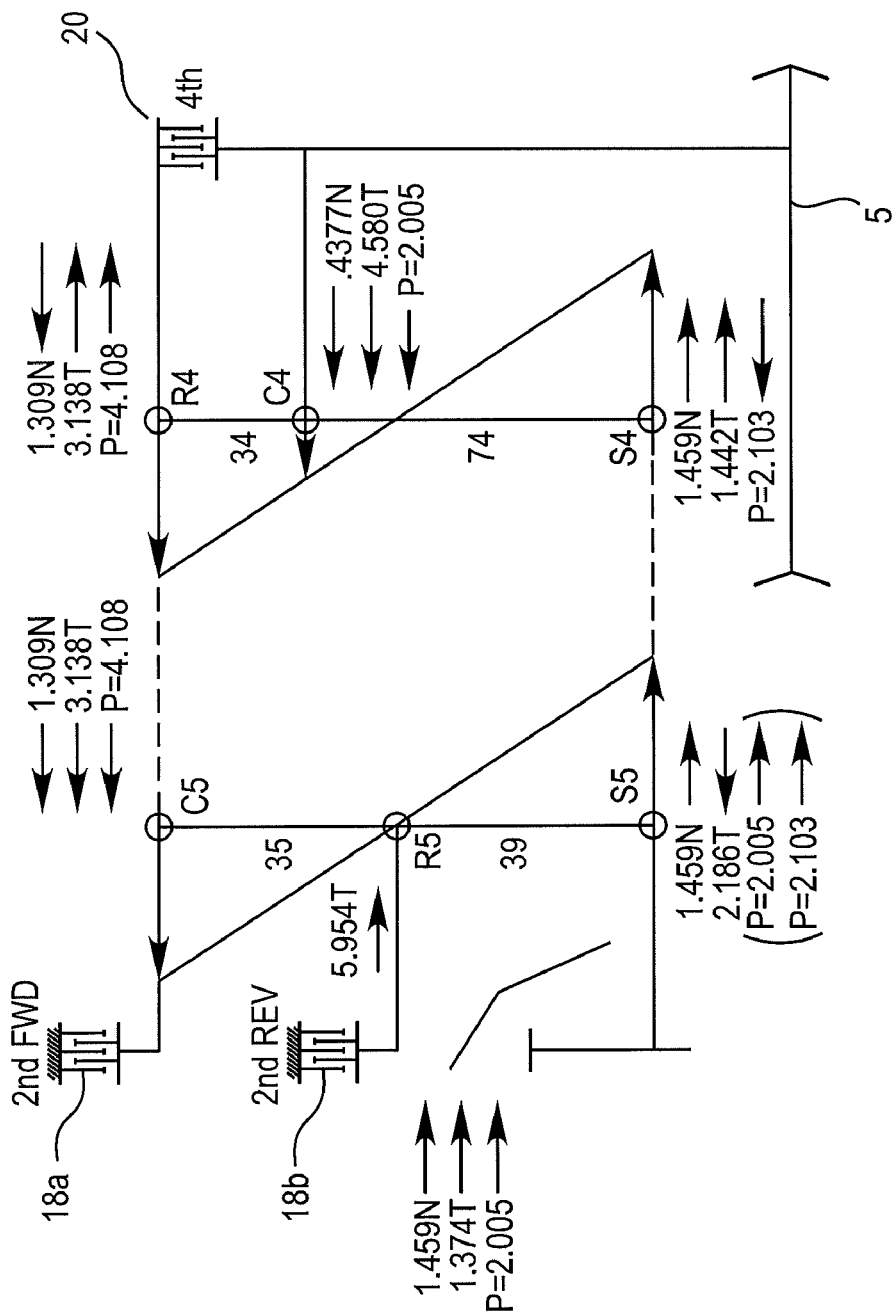

FIG. 16 illustrates the two planetary gearsets of group 9 divided into their two separate levers. Since there is loading on each planetary, the torque values on the individual elements of each planetary gearset are calculated separately and are shown in FIG. 16. Of note is that the junction between ring gear R4 and carrier C5 displays a torque value of 3.138 T. Multiplying this torque by the component speed of 1.309N will yield a power of P=4.108. Furthermore, calculation will determine that sun gear S5 is experiencing a torque of 2.816 T at a speed of 1.459N such that its power also has a value of P=4.108 and that the planetary gearset S5, R5, C5 is in equilibrium. For purposes of explanation, the torque of 2.816 T is shown divided into two parts of 1.374 T and 1.442 T, such that the former value will react the equivalent input torque delivered to sun gear S5; while the latter at the value of 1.442 T is transferred through the junction of S5, S4 to sun gear S4, and establishes equilibrium at planetary gearset S4,C4,R4. When the sun gear S4 torque is multiplied by its speed of 1.309N it will yield a power of P=2.103. Thus equilibrium is established on planetary gearset S4, C4, R4 with a resultant output power of P=2.005 on carrier C4. In summary, both the combined planetaries of group 9 and their individual gearsets are fully balanced. Recognition of this internal power loop is important for the detailed design of the transmission components.

After the shift into 2nd REV range, the "B" section of the hydrostatic assembly will reverse direction and decrease its speed until it achieves a zero output speed on sun gear S1'. This operating condition is shown in FIG. 17.

Figure 17:
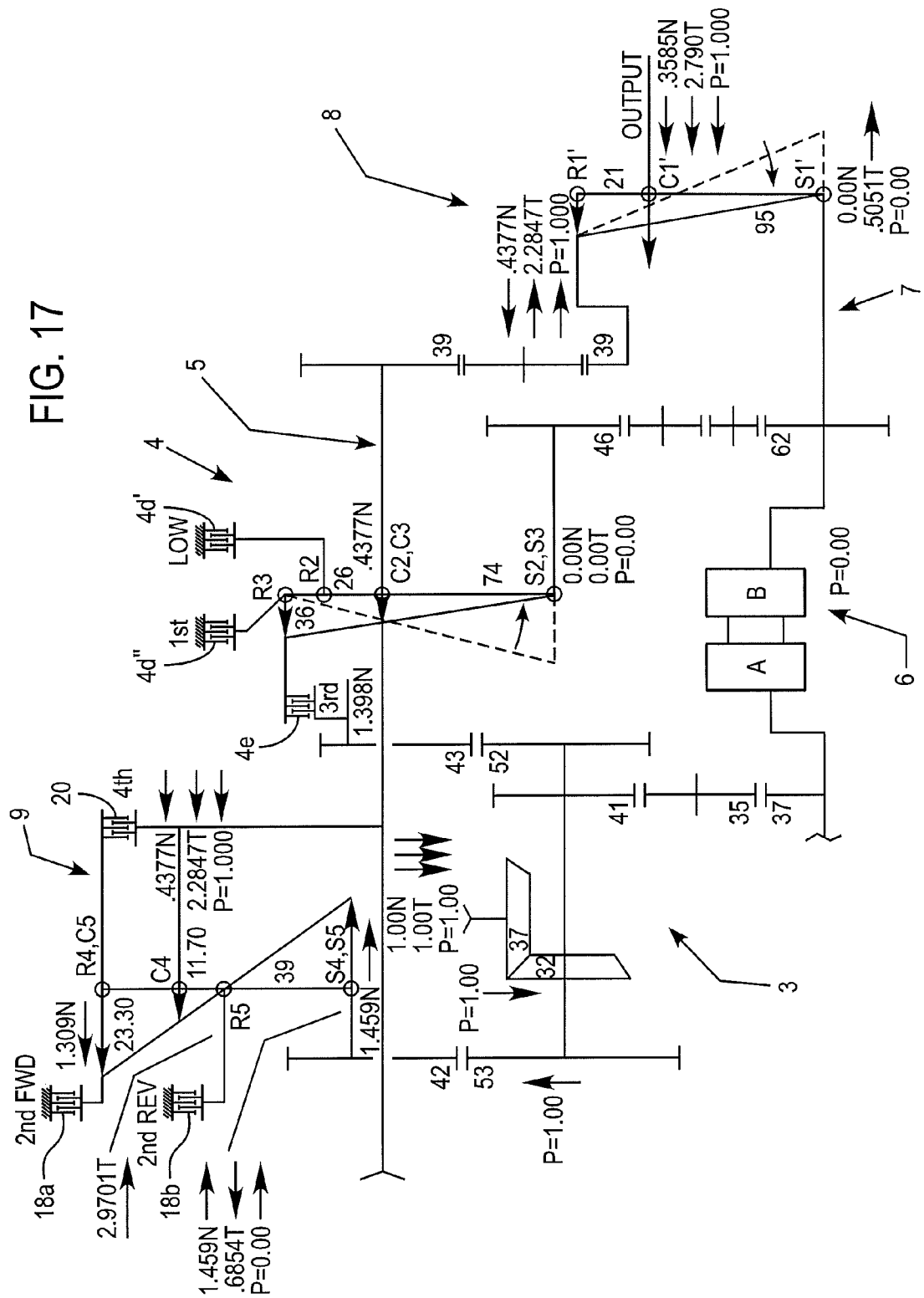

The illustration shown in FIG. 17 indicates that the transmission reverse output speed at carrier C1' has continued to increase by the action of the lever rotating in a clockwise direction about ring gear R1'. And once again, there is no power transfer through the hydrostatic assembly in group 6 and all transmission power is mechanical in nature. The 2nd REV brake 18b continues to hold ring gear R5 stationary such that the reaction is provided by carrier C4 through crossshaft 5 to the output planetary ring gear R1' in group 8. Now, as the hydrostatic assembly in group 6 causes the "B" section to increase its speed in the negative direction, the maximum transmission reverse output speed will be attained as shown in FIG. 18.

Figure 18:
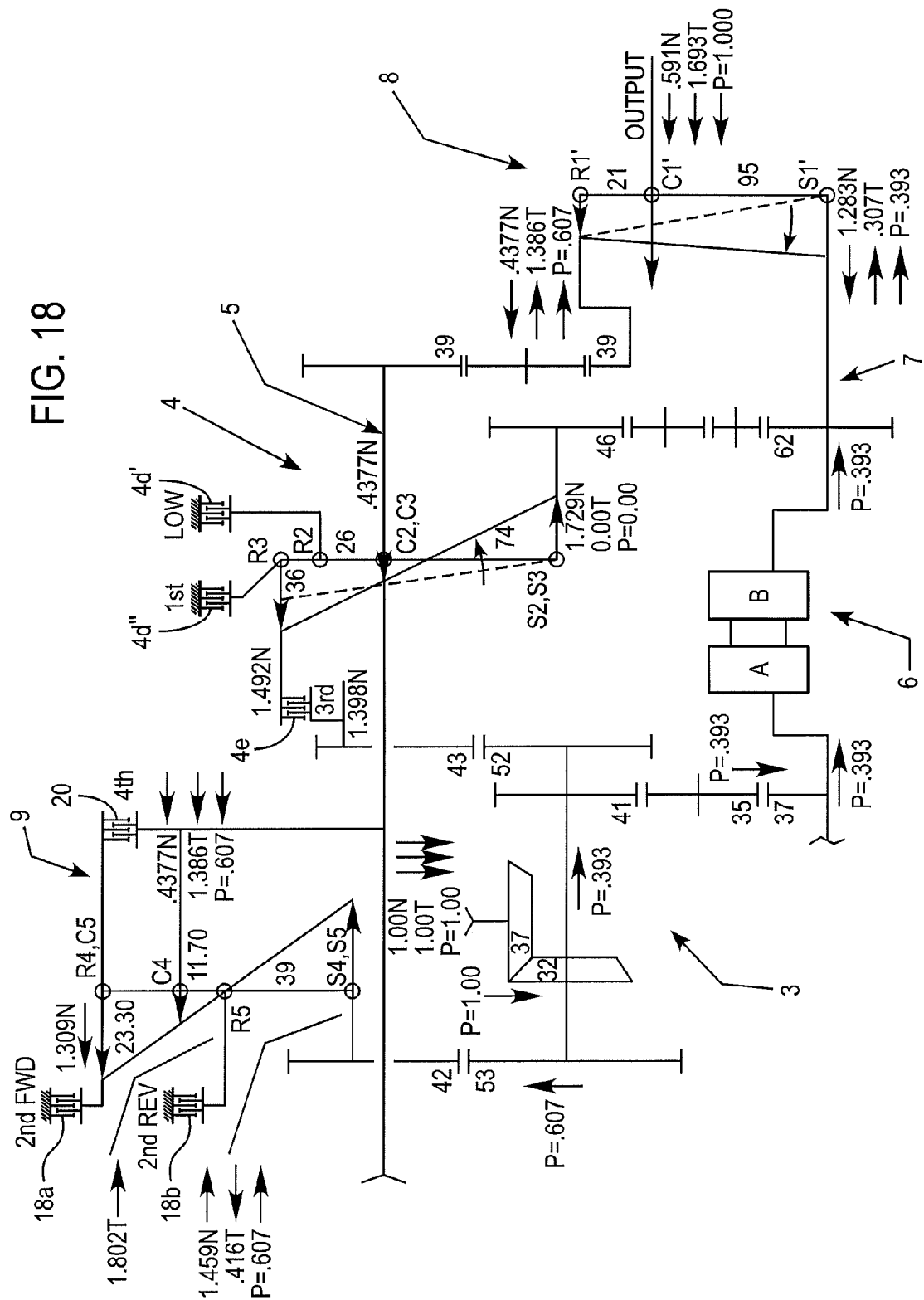

When the hydrostatic assembly in group 6 causes the "B" section to reach its maximum speed of 1.283N in a negative direction as shown in FIG. 18, the transmission has attained its maximum reverse speed. This was achieved by rotation of the lever of the output planetary gearset of group 8 in a clockwise direction about sun gear R1' such that carrier C1' attains a speed of 0.591N in the negative direction. As shown in the illustration, the power flow through the hydrostatic assembly is direct at a value of P=0.393; as is the power at ring gear R1' at a value of P=0.607. As in all 2nd REV range operation, the planetary gearsets in group 9 serve to react the loading from ring gear R1'. As with forward operation of the transmission, an inverse shift sequence is applied as the transmission downshifts through reverse.

Figure 19:
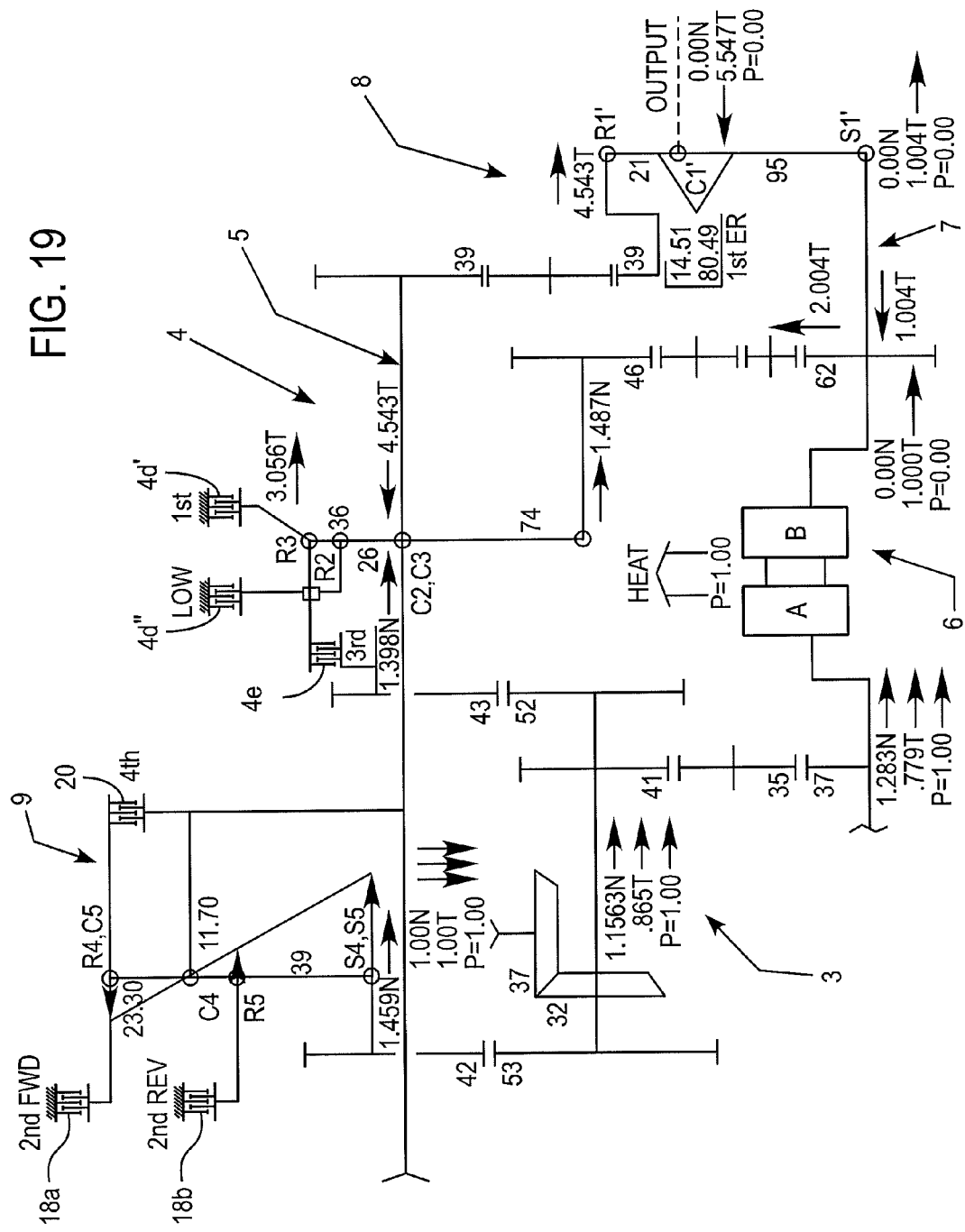

FIG. 19 illustrates the torque loading on the internal transmission components in a stall, or zero output speed condition, in 1st range. This is achieved because the resistive load on the transmission output is such that the "B" section of the hydrostatic assembly is unable to rotate, and excessive leakage will result from the hydrostatic assembly. All power from the engine is lost as heat within the transmission, and thus a stall is not a desirable operating condition. The torque values for a full stall are important for their load impact on transmission components, and as an indication of maximum transmission torque capability. It should be noted however that while the torque parameters are expressed with respect to engine the engine torque value of 1.00 T for consistency purposes, actual output torque will be determined by the hydraulic pressure generated within the hydrostatic assembly.

In order to determine the maximum output torque, the values of equivalent ratio on the lever of output planetary gearset 8 as presented in the discussion of FIG. 3 are utilized by applying a value of 1.00 T to sun gear S1' and solving for the output torque on carrier C1' by summation of moments about the point of equivalent ratio. In effect, this is the maximum possible input torque that can act upon the output planetary. In this manner, the maximum torque on carrier C1' is determined to be 5.547 T. Once this value is ascertained, the remainder of the torque loading on the affected transmission components can be calculated by the methods previously explained. And as shown in FIG. 19, there is regenerative torque developed within gear train 7 and planetary gearsets 4. The stall conditions in FIG. 19 apply in both the forward and reverse output directions.

Figure 20:
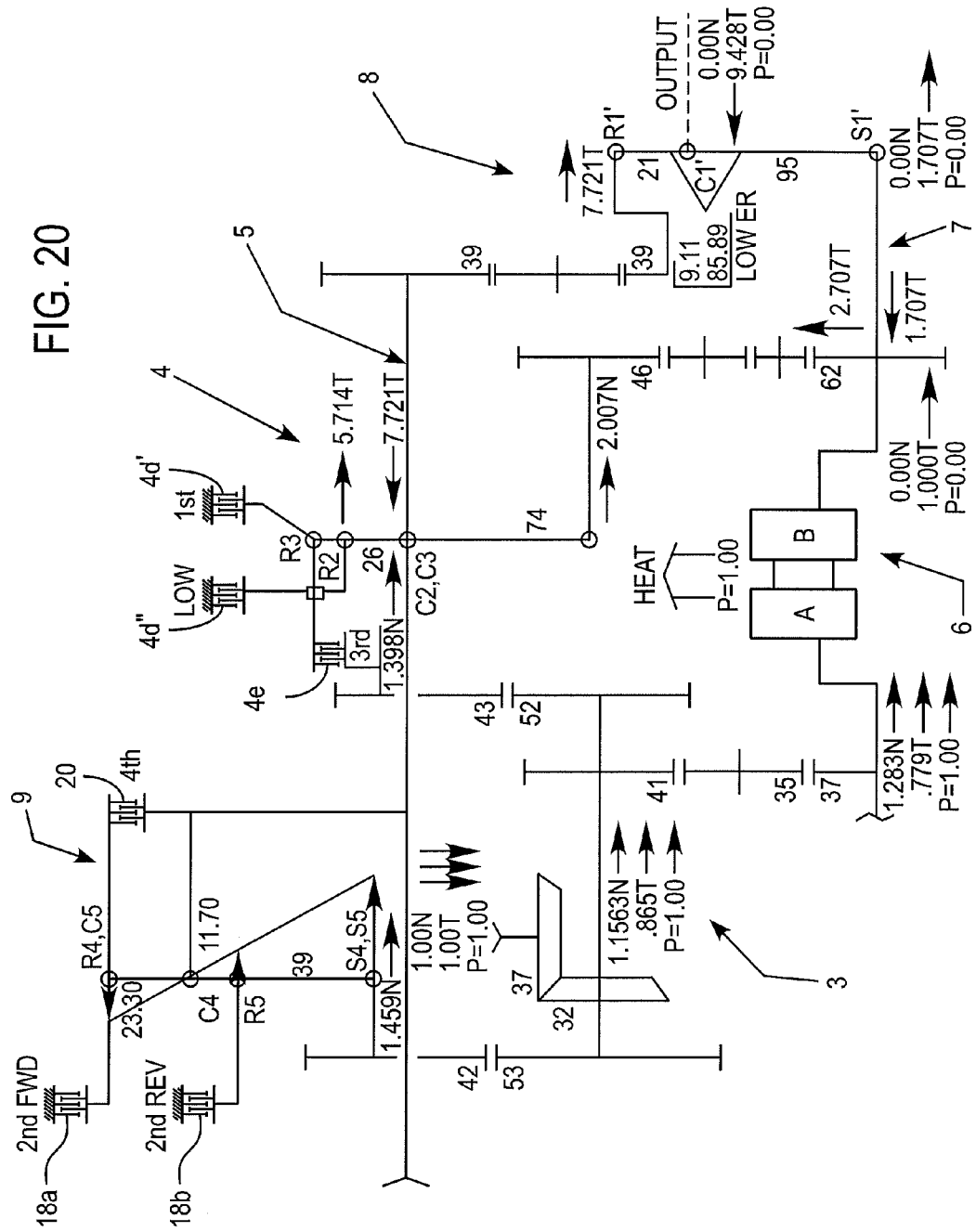

FIG. 20 illustrates the torque loading on internal transmission components in a stall, or zero output speed condition, in LOW range. The operating conditions are identical to those described above, except that the point of equivalent ratio has been calculated to 9.11/85.89. Similarly, the maximum output toque developed at output carrier C1' in found to be 9.428 T, and that the loading from ring gear R1' is transferred through crossshaft 5 to the LOW range brake on ring gear R2 in the planetary gearset 4. As shown in FIG. 20, there is an increase in the regenerative torque loading when compared to the levels in FIG. 19. But most importantly is that the torque generated by the hydrostatic assembly is unchanged. In effect, LOW range can nearly double the transmission output torque by this unique utilization of regenerative loading without affecting the hydrostatic assembly. LOW range operation is affected in both forward and reverse.

Figure 21:
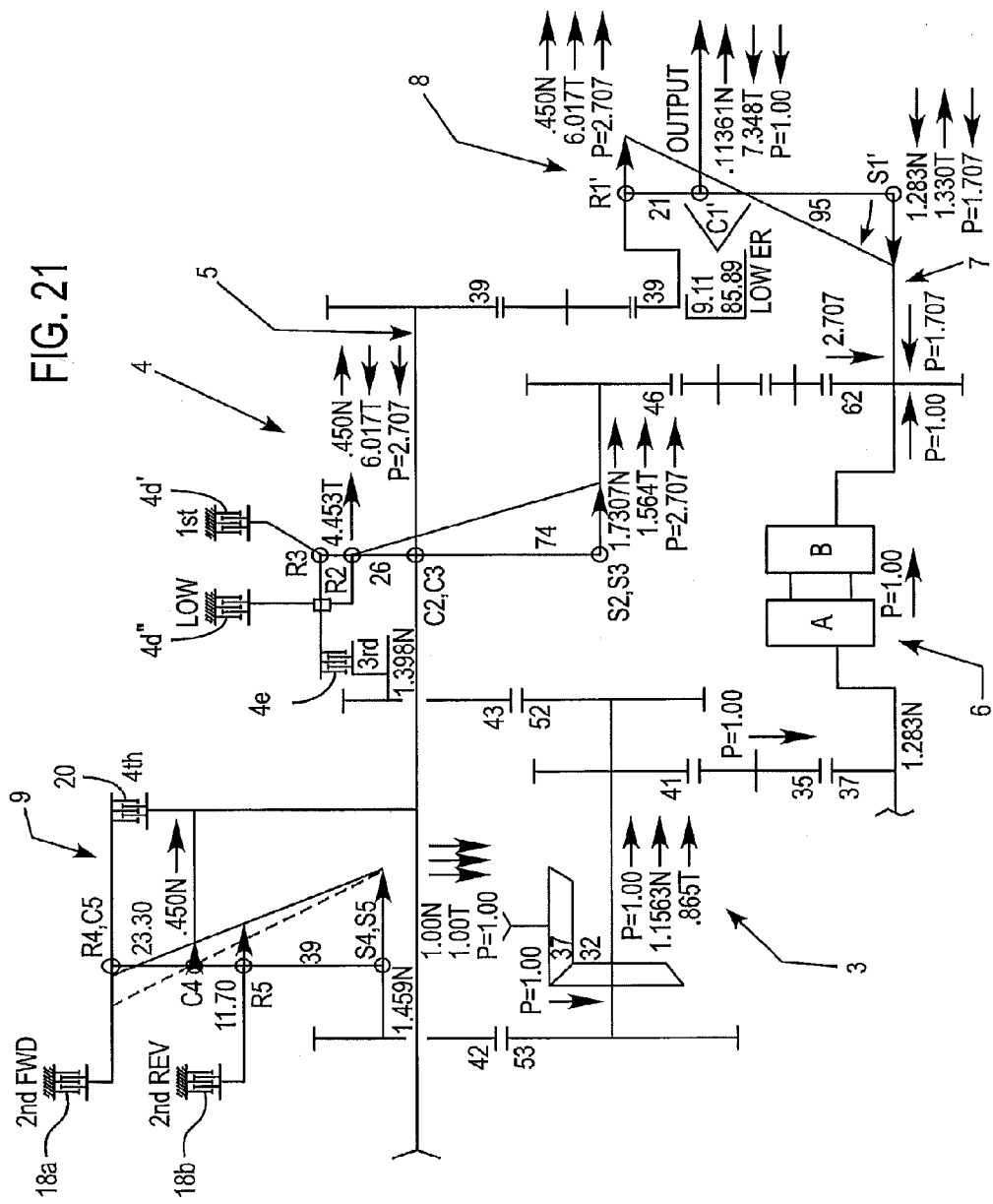

In order to present a full set of operational illustrations, FIG. 21 depicts LOW range performance at its maximum output speed, whether in forward as shown or in reverse. This condition is similar to first range operation as shown in FIG. 3, except that the LOW range brake 4d" is actuated which grounds ring gear R2 of planetary gearset 4 to the transmission housing. And again, the loading on ring gear R1' of output planetary 8 is transferred through crossshaft 5 to carriers C2, C3. Solving for the parameters on sun gears S2, S3 shows that a power value of P=2.707 is transferred through gear train 7 to the junction of group 6, 7 and 8. It will be observed that all elements are in torque and power equilibrium, thus demonstrating the overall balance of the system. As with 1st range there is a regenerative power loop through planetaries 4 and 9; gear train 7 and crossshaft 5.

There is no automatic upshift for LOW range. In operation, LOW range would be manually selected by the operator, and the transmission would remain in LOW range until manually disengaged by the operator; such an upshift to 1st range is normal automotive practice. The same procedure is used whether the vehicle is operating in forward or reverse.

Figure 22A:
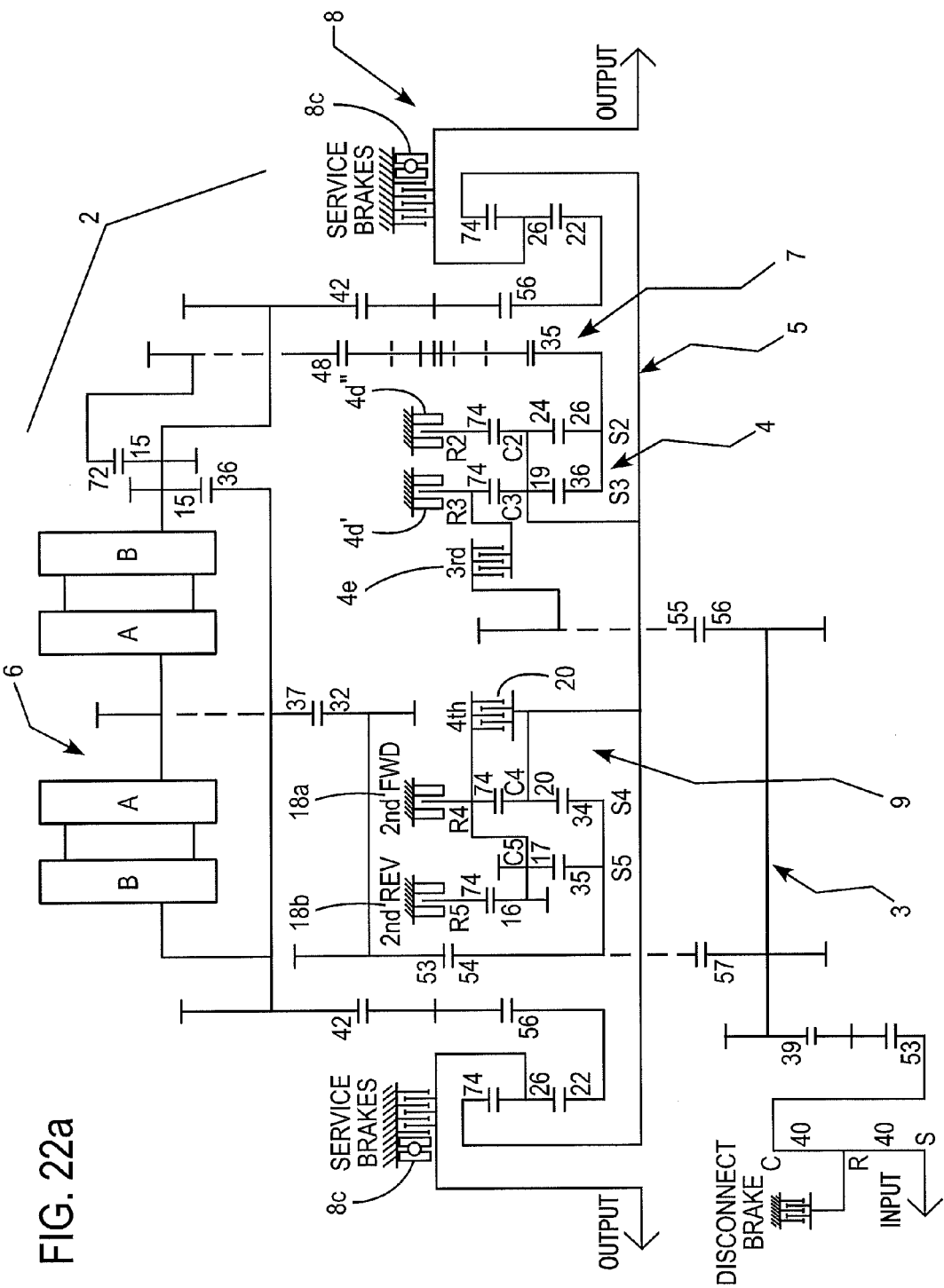
FIG. 22a and FIG. 22b are schematic and lever analogy diagrams, respectively, of an alternative hydromechanical crossdrive steering transmission configuration, wherein the engine/transmission arrangement is transverse instead of in-line.
Figure 22B:
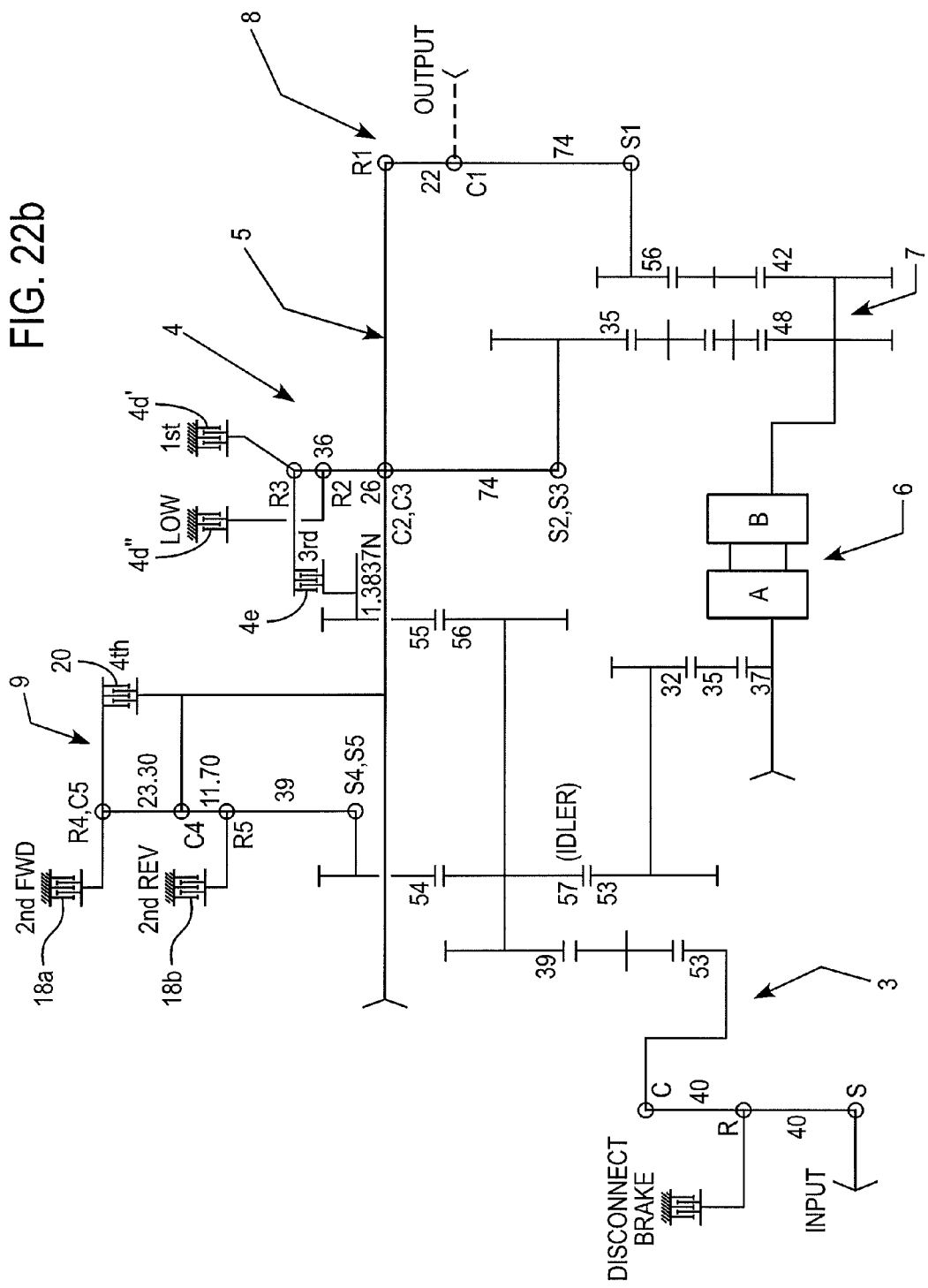

FIG. 22a and FIG. 22b illustrate an alternate transmission configuration. Whereas the preceding illustrations depict an in-line engine/transmission arrangement, FIGS. 22a and 22b present a transverse vehicle layout. In this configuration the axis of the hydrostatic assemblies and the gear architecture are inverted from that shown in FIG. 1a and FIG. 1b. The method of operation is identical in all respects to that previously disclosed. The benefits of a transverse configuration over the more convention layout is closer packaging of the components within the vehicle and the opportunity to increase transmission output torque ratio even further by additional spur gearing between the hydrostatic axis and the output axis. For these reasons, future military tracked vehicle power trains are likely to be a transverse arrangement, and thus the qualities revealed by this invention would be applicable.

FIG. 22a is a schematic diagram of a hydromechanical crossdrive steering transmission arranged in a transverse configuration. All features of this illustration are identical to FIG. 1a except the engine input is altered by an input planetary gearset such that its direction of rotation is reversed. This is solely to accommodate the desired direction of rotation of the internal components of the transmission. In addition, a hydraulically energized brake is also employed, rather than the disconnect clutch shown in FIG. 1a to enable separation of engine power from the transmission for a neutral condition. Alternately, the input planetary gearset could be eliminated and a disconnect clutch utilized should the transmission rotation so require. Returning briefly to FIG. 1a, transmission internal rotation could be reverse by repositioning the driven bevel gear of the input section in group 3.

FIG. 22*b* is a lever analogy diagram of the hydromechanical crossdrive steering transmission as represented in FIG. 22*a*. This illustration shows the alternate transverse configuration as compared to FIG. 1*b*, except for the adaptations of input group 3, a different gear tooth count in the output planetary gearset of group 8, and the additional spur gearing between the output and hydrostatic axis. All gear tooth counts are again presented such that one skilled in the art could determine all operational features in the manner previously disclosed.

An objective of this invention is to provide several unique technical and performance improvements to the HMPT500 hydromechanical crossdrive steering transmission as described in the aforementioned Reed patent. The need for these improvements is driven by increased weight and engine horsepower of contemporary military tracked vehicles. To this end, this disclosure presents a LOW ratio range capability not previously available that restores, or increases, the gradeclimbing ability of the vehicle. In addition, the LOW range feature allows for decreased hydrostatic loading under equivalent operating conditions such that overall transmission efficiency is improved. That is, the greater level of regenerative power in LOW range reduces the internal pressure in the hydrostatic assembly when compared to a similar operating condition in 1st range. This is further proven by substituting equivalent values for hydrostatic torque in FIGS. 18 and 19. Thus a heavier vehicle can be accommodated without performance degradation, and with less potential for the hydrostatic assemblies to stall.

Much discussion has been given regarding the ability of this invention to achieve a power match condition at the shift points. Whereas the aforementioned Reed patent revealed how to achieve a synchronous shift with respect to speed, this invention reveals how to also achieve a synchronous shift with respect to torque, albeit in a reversed direction. Hence the terminology of "power match" in recognition of the product of speed times torque as being power. The ability to power match has several benefits.

First, the torque produced by the hydrostatic assemblies is a function of its internal pressure. The magnitude of this pressure also influences the amount of hydraulic fluid leakage emitted from the hydrostatic assembly. This leakage is a power loss, and adversely affects efficiency. With a power matched design wherein the absolute torque value does not change, this leakage will remain a constant with no increase or decrease in power loss. In the present transmission, the hydrostatic power at the 1st to 2nd shift point is mismatched by a factor 129%, with the result that hydraulic leakage is increased proportionally. The regenerative power flow within the transmission is also increased by this mismatch. Besides adversely effecting transmission performance, this sudden increase in loading causes a higher shock load on the affected components; and a notable harshness at the shift points. When the transmission is utilized with higher horsepower engines, and/or increased weight vehicles, the efficiency losses, shock, and mechanical stress levels become more of a concern. Thus, the ability to power match can compensate for this growth by decreasing these adverse load conditions, and allow the basic design of the current transmission to reliably achieve the desired vehicle performance.

Secondly, power matching the shift points can improve the performance of the transmission control system. This is because the physical operation of the hydrostatic assemblies is achieved by the mechanical movement of a swashplate or, in the case of a ball-piston design, an external race such that the fluid displacement of the assembly is controlled. Because of fluid leakage, the displacement of the swashplate or race will be greater than the change in ratio from the assembly. In affect, there is a certain amount of lead required by the swashplate or race in order to develop the desired output. When a shift occurs, this lead must rapidly reverse direction to accommodate the torque reversal generated by the shift. Compounding the control problem is that the lead value is a variable as determined by load and internal hydraulic pressure. If the shift was power matched, this lead will be the same magnitude after the shift regardless of these conditions. But if the shift was not power matched, the value of lead must be recalculated to determine the additional lead of the swashplate or race after each shift. Thus the ability to power match simplifies the control algorithms by the ability to disregard the need for an additional compensating offset. Basically, a 10% lead before the shift will also be a 10% lead after the shift.

The degree of power match can be subjective. Certainly, in the lower ratio ranges it is very desirable as a means to prevent loss of efficiency or a sudden increased in component loading. However, in the higher ranges where the hydrostatic power contribution is decreasing while mechanical contribution is increasing, a degree of power mismatch can be tolerated without adversely impacting shift quality. Thus an intentional power "overmatch" can be incorporated as a means to increase overall transmission output speed.

It is seen from the forgoing description that the present invention provides an infinitely variable, multiple ratio range, hydromechanical crossdrive steering transmission capable of propelling a tracked vehicle in a most efficient manner by changing transmission ratio to precisely match engine power to output load. Further, the embodiments of the invention offer a smooth, stepless, power flow across the entire operating range of the vehicle without cycling or shock loading to the transmission components or the vehicle drive system. An additional feature provides for a selectable LOW range capability for improved grade climbing or heavily loaded operating conditions.

It will be apparent to those skilled in the art that great modifications and great variations could be made in the multiple range, hydromechanical, crossdrive, steering transmission of the present invention and in the construction of the invention embodiments as set forth above without departing from the scope or the spirit of the invention.

PARTS LIST first driving output—8*a*
second driving output—8*b*
first power input—3*e*
second power input (first and second mechanical inputs)—3*d*, 3*f*
first bidirectional hydrostatic power unit—6*a*
second bidirectional hydrostatic power unit—6*b*
steering differential—SD
steer planetary—SP
first steering differential input—SPa
second steering differential input—SPb
steering differential output—SPc
first selective coupling mechanism—4*a*, 4*b*, 9*a*, 9*b*, 4*e*, 20, 12*a*, 12*b* second selective coupling mechanism—4*a*, 4*b*, 4*e*, 7*a*, 7*b*, 4*f*
first gear element of second mechanical input—3*d*
first input planetary gear set—4*a*
second input planetary gear set—4*b*
first spur gear arrangement—10
second spur gear arrangement—10*a* third spur gear arrangement—10b
second gear element of second mechanical input—16
third input planetary gear set (simple)—9a
fourth input planetary gear set (compound)—9b
first output planetary gear set—8a
second output planetary gear set—8b
first input of first output planetary gear set—8a'
second input of first output planetary gear set—8a"
first input of second output planetary gear set—8b'
second input of second output planetary gear set—8b"
output of first output planetary gear set—C1
output of second out put planetary gear set—C1'
sun gear of first output planetary gear set—S1
sun gear of second output planetary gear set—S1'
ring gear of second input of first output planetary gear set R1
ring gear of second input of second output planetary gear set—R1'
sun gear of first interconnected planetary gear set—S3
sun gear of second interconnected planetary gear set—S2
sun gear of third interconnected planetary gear set—S4
sun gear of fourth interconnected planetary gear set—S5
ring gear of first interconnected planetary gear set—R3
ring gear of second interconnected planetary gear set—R2
ring gear of third interconnected planetary gear set—R4
ring gear of fourth interconnected planetary gear set—R5
planet carrier of first interconnected planetary gear set—C3
planet carrier of second interconnected planetary gear set—C2
planet carrier of third interconnected planetary gear set—C4
planet carrier of fourth interconnected planetary gear set—C5
  third range clutch—4e
  first selective grounding mechanisms—4d; 4d" fourth range clutch—20
  second selective grounding mechanisms—18a, 18b disconnect clutch—3a

What is claimed is:

1. A hydromechanical drive and steering mechanism for a tracked vehicle, the mechanism comprising:
first and second driving outputs;
first and second power inputs arranged for driving connection to a prime mover;
a hydraulic drive mechanism comprising first and second bidirectional hydrostatic power units connected to be driven by the first power input and arranged to provide an infinitely variable transmission output speed ratio between the first power input and the first and second driving outputs;
the first driving output coupled to the first hydrostatic power unit output of the first hydrostatic power unit;
the second driving output connected to the hydrostatic power unit output of the second hydrostatic power unit;
a steering differential including:
  a first steering differential input coupled to the first hydrostatic power unit output,
  a second steering differential input coupled to the second hydrostatic power unit output, and
  a steering differential output providing an average output rotation of the first and second steering differential inputs;
a first selective coupling mechanism for selectively coupling the second power input to the first and second driving outputs; and
a second selective coupling mechanism for selectively coupling the steering differential output to the second power input;
wherein selective actuation of the first and second selective coupling mechanisms causes the transmission to drive in distinct ratio ranges;
wherein the second power input includes a first mechanical input comprising a first gear element and interconnected first and second input planetary gear sets connected to the first gear element, the first and second input planetary gear sets being connected to the output of the steer differential by a first spur gear arrangement for delivering power to, and receiving power from, the steer differential; the first and second input planetary gear sets also being connected by a second spur gear arrangement to the first driving output and connected by a third spur gear arrangement to the second driving output; the first and second input planetary gear sets being shiftable to produce low, first and third ratio ranges at each of the first and second driving outputs; and
wherein the second power input further includes a second mechanical input comprising a second gear element connected to interconnected third and fourth input planetary gear sets; the third and fourth input planetary gear sets being connected to the first driving output by the second spur gear arrangement and to the second driving output by the third spur gear arrangement; the third and fourth input planetary gear sets being shiftable to produce second-forward, second-reverse, and fourth ranges at each of the first and second driving outputs.

2. The hydromechanical transmission according to claim 1, wherein the first and second driving outputs comprise first and second output planetary gear sets, respectively, each having first and second inputs and an output; the first input of the first output planetary gear set including a sun gear coupled to the output of the first hydrostatic power unit; the first input of the second output planetary gear set including a sun gear connected to the output of the second hydrostatic power unit; the second input of the first output planetary gear set including a ring gear connected to the first, second, third and fourth planetary gear sets by the second spur gear arrangement; the second input of the second output planetary gear set including a ring gear connected to the first, second, third and fourth input planetary gear sets by the third spur gear arrangement.

3. The hydromechanical transmission according to claim 1, wherein the number of gear tooth meshes of the first spur gear arrangement and of the third spur gear arrangement do not both yield an integer when divided by 2.

4. The hydromechanical transmission according to claim 2, wherein each of the first and second input planetary gear sets is a simple planetary gear set comprising a sun gear and a ring gear interconnected by a single set of planet gears mounted on a planet carrier; the sun gears of the first and second input planetary gear sets being coupled to the first spur gear arrangement, the planet carriers of each of the first and second input planetary gear sets being coupled to the first and second driving outputs; the first selective coupling mechanism operable to selectively couple the first gear element of the first mechanical input to one of the ring gears of the first and second input planetary gear sets; and a first selective grounding mechanism for selectively grounding the ring gears of the first and second input planetary gear sets.

5. The hydromechanical transmission according to claim 1, wherein said third input planetary gear set is a simple planetary gear set comprising a sun gear and a ring gear interconnected by a single set of planet gears mounted on a planet carrier; the fourth input planetary gear set being a compound gear set comprising two sets of planet gears carried by a planet gear carrier and connecting a sun gear to a ring gear of the compound planetary gear set, both said sun gears of the third and fourth input planetary gear sets being coupled to the second gear element of the second mechanical input; the ring gear of the third input planetary gear set being connected to the planet gear carrier of the fourth input planetary gear set; a selectively actuable coupler for selectively coupling together the ring gear and the planetary gear carrier of the third input planetary gear set; the planet gear carrier of the third input planetary gear set being coupled to the first and second driving outputs; a second selective grounding mechanism for selectively grounding the ring gears of the third and fourth input gear sets.

6. The hydromechanical transmission according to claim 4, wherein combined operation of the first and second hydrostatic power unit from a quiescent, or 1:0, output rotation causes the sun gears and the ring gears of the first and second driving outputs to rotate in opposing directions when either of the ring gears of the first and second input planetary gear sets is grounded by the first selective grounding mechanisms, wherein such output rotation is towards the +1:1 direction or the −1.1 direction.

7. The hydromechanical transmission according to claim 6, wherein an infinite varying of the output speed of the first and second hydrostatic power units in combination from their quiescent output rotation causes the output rotation of each planet gear carrier of the first and second output planetary gears to vary at an infinitely variable ratio; said ratio being a combination in speed and direction of both inputs of the first and second output planetary gear sets, and being of either positive or negative direction; a magnitude of such variable ratio being established by selective grounding of the ring gear of either ring gear of the first and second input planetary gear sets by the first selective grounding mechanisms, wherein transmission output is infinitely variable in low range in both forward and reverse vehicle direction, and infinitely variable in first ratio range in both forward and reverse vehicle direction, wherein all power is delivered through the first and second hydrostatic power units.

8. The hydromechanical transmission according to claim 7, wherein the power from the prime mover is combined by the steer differential with regenerative power developed by the first and second output planetary gear sets, and such combined power is delivered to the ring gears of the output planetary gear sets, wherein a total magnitude of such combined power is greater than said power from the prime mover.

9. The hydromechanical transmission according to claim 5, wherein gear elements of the third and fourth input planetary gear sets, and the spur gear elements of the steer differential and the first and second output planetary gear sets, are arranged such that increasing transmission output speed in the first ratio range causes the ring gear speed of either the third and fourth input planetary gear sets to approach zero rotational speed; at which speed, releasing of the first range grounded ring gear and simultaneous grounding of the ring gear of either of the third or fourth input planetary gear sets causes the transmission to undergo a speed-synchronous shift into second ratio range without the occurrence of a change in either prime mover input speed or transmission output speed, wherein the shift into second ratio range allows output rotation of the first and second hydrostatic power units to reverse direction and proceed in an infinitely variable manner through their 1:0 (neutral) condition and continue in the opposite direction of rotation, wherein transmission output is infinitely variable in second ratio range in both forward and reverse vehicle direction.

10. The hydromechanical transmission according to claim 9, wherein the gear elements of the third and fourth input planetary gear sets are arranged to cause minimum aberration of either prime mover input torque or transmission output torque during such shift into second ratio range; wherein the shift into second ratio range causes power to be transferred from the prime mover through the second mechanical input, wherein transmission output power is hydromechanical in nature and flows through the hydrostatic power units to reverse direction; such reversal causing regenerative power from the output planetary gear sets to be directed through the first mechanical input to the second mechanical input and combined with prime mover power within either of the third or fourth input planetary gear sets, wherein such combined power is delivered to the ring gears of the first and second output planetary gear sets; wherein the total magnitude of such power is greater than the power from the prime mover.

11. The hydromechanical transmission according to claim 10, wherein the regenerative power reduces in magnitude as the output speed of the first and second hydrostatic power units decreases towards their 1:0 condition; the hydraulic power component thereof attaining a zero value at such 1:0 condition wherein all transmission output power is mechanical in nature; wherein an increasing of hydrostatic unit speed in the opposite direction causes power of the first and second hydrostatic power units to become direct in nature and to combine with mechanical power at the first and second output planetary gear sets.

12. The hydromechanical transmission according to claim 11, wherein an infinite varying of the output speed of the first and second hydrostatic power units towards the +1:1, or outputwise, direction during the second forward ratio range operation produces an increase in the rotational speed of the ring gears of the first and second input planetary gear sets by operation of the spur gear elements of the steer differential and the spur gear elements of the first and second output planetary gear sets; wherein as the first and second selective coupling mechanisms attain the same rotational speed as the first gear element of the second mechanical input, the first selective coupling mechanism becomes engaged upon release of the second range forward grounded ring gear, causing the transmission to undergo a speed-synchronous shift into third ratio range with no change in either prime mover input speed or transmission output speed; wherein the shift into third ratio range allowing output rotation of the first and second hydrostatic power units to reverse direction and proceed in an infinitely variable manner through their 1:0 condition and continue in the opposite, anti-outputwise, direction of rotation, such that the transmission output is infinitely variable in third range vehicle operation.

13. The hydromechanical transmission according to claim 12, wherein the gear elements are arranged such that the shift into third ratio range causes minimum aberration of either prime mover input torque or transmission output torque and transfers power from the prime mover through the first gear element of the second mechanical input, wherein the transmission output is hydromechanical in nature; the shift into third ratio range also causing power flow through the first and second hydrostatic power units to reverse direction thereby directing regenerative power through the first mechanical input to the second mechanical input and into combination with prime mover power within the first and second input planetary gear sets, such combined power being further divided by the first and second input planetary gear sets between the spur gear elements of the ring gears of the first and second output planetary gear sets and by the spur gear elements of the steer differential to the sun gears of the first and second output planetary gear sets, wherein power delivered to both inputs of the first and second output planetary gear sets being direct in nature.

14. The hydromechanical transmission according to claim 13, wherein the regenerative power reduces in magnitude as the output speed of the first and second hydrostatic power units decrease towards their 1:0 condition in the opposite, anti-outputwise, direction; the hydraulic power attaining a zero value at such 1:0 condition; wherein action of the steer differential spur gear elements through the first and second input planetary gear sets causing the output speed of the ring gears of the first and second output planetary gear sets to increase also causes transmission output speed to increase in an infinitely variable manner as the speed of the first and second hydrostatic power units decreases; wherein an increase in hydrostatic unit speed in the anti-outputwise direction causes the hydrostatic unit power flow to become direct and causes prime mover input power to be divided between the first and second mechanical inputs with regenerative power again developed within the steer differential and with the speed of the first and second ring gears of the output planetary gear sets continuing to increase.

15. The hydromechanical transmission according to claim 14, wherein gear elements of the third and fourth input planetary gear sets are arranged such that an increasing speed of the ring gears of the first and second output planetary gear sets in the third ratio range causes the ring gear and the planetary gear carrier of the third input planetary gear set to become equal in speed; wherein at such equal speed, a releasing of the first selectively actuable coupler and simultaneous energizing of the selectively actuable coupler of the ring gear and the planetary carrier of the third input planetary gear set causes the transmission to undergo a speed-synchronous shift into fourth ratio range with no accompanying change in either prime mover input speed or transmission output speed; such shift into fourth ratio range allowing output rotation of the first and second hydrostatic power units to reverse direction and proceed in an infinitely variable manner through their 1:0 condition and continue in the opposite, or outputwise, direction of rotation, wherein transmission output is infinitely variable in fourth range vehicle operation.

16. The hydromechanical transmission according to claim 15, wherein the gear elements of third and fourth input planetary gear sets are arranged such that the shift into fourth ratio range causes minimum aberration of either prime mover input torque or transmission output torque; the shift into fourth ratio range causing power to transfer from the prime mover through the second gear element of the second mechanical input, causing transmission output to be hydromechanical in nature; the shift into fourth ratio range causing power flow through the hydrostatic power units to again reverse direction, such reversal directing regenerative power through the first mechanical input to the second mechanical input and into combination with prime mover power within the third and fourth input planetary gear sets.

17. The hydromechanical transmission according to claim 16, wherein the regenerative power resulting from the shift into fourth ratio range reduces in magnitude as the output speed of the first and second hydrostatic power decrease towards their 1:0 condition; the hydraulic power attaining a zero value at the 1:0 condition; wherein an increase in hydrostatic power unit speed in the outputwise direction of rotation causes power of the first and second hydrostatic power units to become direct and prime mover input power to be divided between the first and second mechanical inputs; the hydrostatic and prime mover power combining at the first and second inputs of the first and second output planetary gear sets to propel the vehicle in the forward direction in an infinity variable manner.

18. The transmission according to claim 17, wherein a replacement of the first and second hydrostatic power units with bi-direction motor/generator power units causes the transmission to be electromechanical in nature.

19. A hydromechanical drive and steering mechanism for a tracked vehicle, the mechanism comprising:
   first and second driving outputs;
   first and second power inputs arranged for driving connection to a prime mover;
   a hydraulic drive mechanism comprising first and second bidirectional hydrostatic power units connected to be driven by the first power input and arranged to provide an infinitely variable transmission output speed ratio between the first power input and the first and second driving outputs;
   the first driving output coupled to the first hydrostatic power unit output of the first hydrostatic power unit;
   the second driving output connected to the hydrostatic power unit output of the second hydrostatic power unit;
   a steering differential including:
      a first steering differential input coupled to the first hydrostatic power unit output,
      a second steering differential input coupled to the second hydrostatic power unit output, and
      a steering differential output providing an average output rotation of the first and second steering differential inputs;
   a first selective coupling mechanism for selectively coupling the second power input to the first and second driving outputs; and
   a second selective coupling mechanism for selectively coupling the steering differential output to the second power input;
   wherein selective actuation of the first and second selective coupling mechanisms causes the transmission to drive in distinct ratio ranges;
   wherein the second power input includes a first mechanical input comprising a first gear element and interconnected first and second input planetary gear sets connected to the first gear element, the first and second input planetary gear sets being connected to the output of the steer differential by a first spur gear arrangement for delivering power to, and receiving power from, the steer differential; the first and second input planetary gear sets also being connected by a second spur gear arrangement to the first driving output and connected by a third spur gear arrangement to the second driving output; the first and second input planetary gear sets being shiftable to produce low, first and third ratio ranges at each of the first and second driving outputs; and
   wherein the number of gear tooth meshes of the first spur gear arrangement and of the third spur gear arrangement do not both yield an integer when divided by 2.

20. The hydromechanical transmission according to claim 19, wherein the second power input further includes a second mechanical input comprising a second gear element connected to interconnected third and fourth input planetary gear sets; the third and fourth input planetary gear sets being connected to the first driving output by the second spur gear arrangement and to the second driving output by the third spur gear arrangement; the third and fourth input planetary gear sets being shiftable to produce second-forward, second-reverse, and fourth ranges at each of the first and second driving outputs; and wherein the first and second driving outputs comprise first and second output planetary gear sets, respectively, each having first and second inputs and an output; the first input of the first output planetary gear set including a sun gear coupled to the output of the first hydrostatic power unit; the first input of the second output planetary gear set including a sun gear connected to the output of the second hydrostatic power unit; the second input of the first output planetary gear set including a ring gear connected to the first, second, third and fourth planetary gear sets by the second spur gear arrangement; the second input of the second output planetary gear set including a ring gear connected to the first, second, third and fourth input planetary gear sets by the third spur gear arrangement.

21. The hydromechanical transmission according to claim 20, wherein each of the first and second input planetary gear sets is a simple planetary gear set comprising a sun gear and a ring gear interconnected by a single set of planet gears mounted on a planet carrier; the sun gears of the first and second input planetary gear sets being coupled to the first spur gear arrangement, the planet carriers of each of the first and second input planetary gear sets being coupled to the first and second driving outputs; the first selective coupling mechanism operable to selectively couple the first gear element of the first mechanical input to one of the ring gears of the first and second input planetary gear sets; and a first selective grounding mechanism for selectively grounding the ring gears of the first and second input planetary gear sets.

22. The hydromechanical transmission according to claim 21, wherein combined operation of the first and second hydrostatic power unit from a quiescent, or 1:0, output rotation causes the sun gears and the ring gears of the first and second driving outputs to rotate in opposing directions when either of the ring gears of the first and second input planetary gear sets is grounded by the first selective grounding mechanisms, wherein such output rotation is towards the +1:1 direction or the −1.1 direction.

23. The hydromechanical transmission according to claim 22, wherein an infinite varying of the output speed of the first and second hydrostatic power units in combination from their quiescent output rotation causes the output rotation of each planet gear carrier of the first and second output planetary gears to vary at an infinitely variable ratio; said ratio being a combination in speed and direction of both inputs of the first and second output planetary gear sets, and being of either positive or negative direction; a magnitude of such variable ratio being established by selective grounding of the ring gear of either ring gear of the first and second input planetary gear sets by the first selective grounding mechanisms, wherein transmission output is infinitely variable in low range in both forward and reverse vehicle direction, and infinitely variable in first ratio range in both forward and reverse vehicle direction, wherein all power is delivered through the first and second hydrostatic power units.

24. The hydromechanical transmission according to claim 23, wherein the power from the prime mover is combined by the steer differential with regenerative power developed by the first and second output planetary gear sets, and such combined power is delivered to the ring gears of the output planetary gear sets, wherein a total magnitude of such combined power is greater than said power from the prime mover.

25. The hydromechanical transmission according to claim 19, wherein the second power input further includes a second mechanical input comprising a second gear element connected to interconnected third and fourth input planetary gear sets; the third and fourth input planetary gear sets being connected to the first driving output by the second spur gear arrangement and to the second driving output by the third spur gear arrangement; the third and fourth input planetary gear sets being shiftable to produce second-forward, second-reverse, and fourth ranges at each of the first and second driving outputs; and wherein said third input planetary gear set is a simple planetary gear set comprising a sun gear and a ring gear interconnected by a single set of planet gears mounted on a planet carrier; the fourth input planetary gear set being a compound gear set comprising two sets of planet gears carried by a planet gear carrier and connecting a sun gear to a ring gear of the compound planetary gear set, both said sun gears of the third and fourth input planetary gear sets being coupled to the second gear element of the second mechanical input; the ring gear of the third input planetary gear set being connected to the planet gear carrier of the fourth input planetary gear set; a selectively actuable coupler for selectively coupling together the ring gear and the planetary gear carrier of the third input planetary gear set; the planet gear carrier of the third input planetary gear set being coupled to the first and second driving outputs; a second selective grounding mechanism for selectively grounding the ring gears of the third and fourth input gear sets.

26. The hydromechanical transmission according to claim 25, wherein gear elements of the third and fourth input planetary gear sets, and the spur gear elements of the steer differential and the first and second output planetary gear sets, are arranged such that increasing transmission output speed in the first ratio range causes the ring gear speed of either the third and fourth input planetary gear sets to approach zero rotational speed; at which speed, releasing of the first range grounded ring gear and simultaneous grounding of the ring gear of either of the third or fourth input planetary gear sets causes the transmission to undergo a speed-synchronous shift into second ratio range without the occurrence of a change in either prime mover input speed or transmission output speed, wherein the shift into second ratio range allows output rotation of the first and second hydrostatic power units to reverse direction and proceed in an infinitely variable manner through their 1:0 (neutral) condition and continue in the opposite direction of rotation, wherein transmission output is infinitely variable in second ratio range in both forward and reverse vehicle direction.

27. The hydromechanical transmission according to claim 26, wherein the gear elements of the third and fourth input planetary gear sets are arranged to cause minimum aberration of either prime mover input torque or transmission output torque during such shift into second ratio range; wherein the shift into second ratio range causes power to be transferred from the prime mover through the second mechanical input, wherein transmission output power is hydromechanical in nature and flows through the hydrostatic power units to reverse direction; such reversal causing regenerative power from the output planetary gear sets to be directed through the first mechanical input to the second mechanical input and combined with prime mover power within either of the third or fourth input planetary gear sets, wherein such combined power is delivered to the ring gears of the first and second output planetary gear sets; wherein the total magnitude of such power is greater than the power from the prime mover.

28. The hydromechanical transmission according to claim 27, wherein the regenerative power reduces in magnitude as the output speed of the first and second hydrostatic power units decreases towards their 1:0 condition; the hydraulic power component thereof attaining a zero value at such 1:0 condition wherein all transmission output power is mechanical in nature; wherein an increasing of hydrostatic unit speed in the opposite direction causes power of the first and second hydrostatic power units to become direct in nature and to combine with mechanical power at the first and second output planetary gear sets.

29. The hydromechanical transmission according to claim 28, wherein an infinite varying of the output speed of the first and second hydrostatic power units towards the +1:1, or outputwise, direction during the second forward ratio range operation produces an increase in the rotational speed of the ring gears of the first and second input planetary gear sets by operation of the spur gear elements of the steer differential and the spur gear elements of the first and second output planetary gear sets; wherein as the first and second selective coupling mechanisms attain the same rotational speed as the first gear element of the second mechanical input, the first selective coupling mechanism becomes engaged upon release of the second range forward grounded ring gear, causing the transmission to undergo a speed-synchronous shift into third ratio range with no change in either prime mover input speed or transmission output speed; wherein the shift into third ratio range allowing output rotation of the first and second hydrostatic power units to reverse direction and proceed in an infinitely variable manner through their 1:0 condition and continue in the opposite, anti-outputwise, direction of rotation, such that the transmission output is infinitely variable in third range vehicle operation.

30. The hydromechanical transmission according to claim 29, wherein the gear elements are arranged such that the shift into third ratio range causes minimum aberration of either prime mover input torque or transmission output torque and transfers power from the prime mover through the first gear element of the second mechanical input, wherein the transmission output is hydromechanical in nature; the shift into third ratio range also causing power flow through the first and second hydrostatic power units to reverse direction thereby directing regenerative power through the first mechanical input to the second mechanical input and into combination with prime mover power within the first and second input planetary gear sets, such combined power being further divided by the first and second input planetary gear sets between the spur gear elements of the ring gears of the first and second output planetary gear sets and by the spur gear elements of the steer differential to the sun gears of the first and second output planetary gear sets, wherein power delivered to both inputs of the first and second output planetary gear sets being direct in nature.

31. The hydromechanical transmission according to claim 30, wherein the regenerative power reduces in magnitude as the output speed of the first and second hydrostatic power units decrease towards their 1:0 condition in the opposite, anti-outputwise, direction; the hydraulic power attaining a zero value at such 1:0 condition; wherein action of the steer differential spur gear elements through the first and second input planetary gear sets causing the output speed of the ring gears of the first and second output planetary gear sets to increase also causes transmission output speed to increase in an infinitely variable manner as the speed of the first and second hydrostatic power units decreases; wherein an increase in hydrostatic unit speed in the anti-outputwise direction causes the hydrostatic unit power flow to become direct and causes prime mover input power to be divided between the first and second mechanical inputs with regenerative power again developed within the steer differential and with the speed of the first and second ring gears of the output planetary gear sets continuing to increase.

32. The hydromechanical transmission according to claim 31, wherein gear elements of the third and fourth input planetary gear sets are arranged such that an increasing speed of the ring gears of the first and second output planetary gear sets in the third ratio range causes the ring gear and the planetary gear carrier of the third input planetary gear set to become equal in speed; wherein at such equal speed, a releasing of the first selectively actuable coupler and simultaneous energizing of the selectively actuable coupler of the ring gear and the planetary carrier of the third input planetary gear set causes the transmission to undergo a speed-synchronous shift into fourth ratio range with no accompanying change in either prime mover input speed or transmission output speed; such shift into fourth ratio range allowing output rotation of the first and second hydrostatic power units to reverse direction and proceed in an infinitely variable manner through their 1:0 condition and continue in the opposite, or outputwise, direction of rotation, wherein transmission output is infinitely variable in fourth range vehicle operation.

33. The hydromechanical transmission according to claim 32, wherein the gear elements of third and fourth input planetary gear sets are arranged such that the shift into fourth ratio range causes minimum aberration of either prime mover input torque or transmission output torque; the shift into fourth ratio range causing power to transfer from the prime mover through the second gear element of the second mechanical input, causing transmission output to be hydromechanical in nature; the shift into fourth ratio range causing power flow through the hydrostatic power units to again reverse direction, such reversal directing regenerative power through the first mechanical input to the second mechanical input and into combination with prime mover power within the third and fourth input planetary gear sets.

34. The hydromechanical transmission according to claim 33, wherein the regenerative power resulting from the shift into fourth ratio range reduces in magnitude as the output speed of the first and second hydrostatic power decrease towards their 1:0 condition; the hydraulic power attaining a zero value at the 1:0 condition; wherein an increase in hydrostatic power unit speed in the outputwise direction of rotation causes power of the first and second hydrostatic power units to become direct and prime mover input power to be divided between the first and second mechanical inputs; the hydrostatic and prime mover power combining at the first and second inputs of the first and second output planetary gear sets to propel the vehicle in the forward direction in an infinity variable manner.

35. The transmission according to claim 34, wherein a replacement of the first and second hydrostatic power units with bi-direction motor/generator power units causes the transmission to be electromechanical in nature.

* * * * *